(12) United States Patent
Schmidt et al.

(10) Patent No.: US 8,799,094 B2
(45) Date of Patent: Aug. 5, 2014

(54) PRODUCT CATALOG MANAGEMENT SYSTEM AND METHOD

(75) Inventors: Douglas Schmidt, Huntington, NY (US); Alexei Uskov, Moscow (RU); Andrei Lapin, Moscow (RU); Severin Pankov, Moscow (RU); Sergey Gudkov, Moscow (RU); Sergey Kolemasov, Moscow (RU); Vlad Smolovik, Vaud (CH)

(73) Assignee: CBS Interactive Inc., San Francisco, CA (US)

( * ) Notice: Subject to any disclaimer, the term of this patent is extended or adjusted under 35 U.S.C. 154(b) by 783 days.

(21) Appl. No.: 12/276,666

(22) Filed: Nov. 24, 2008

(65) Prior Publication Data
US 2009/0138320 A1 May 28, 2009

Related U.S. Application Data

(62) Division of application No. 11/604,388, filed on Nov. 27, 2006.

(60) Provisional application No. 60/739,896, filed on Nov. 28, 2005.

(51) Int. Cl.
*G06Q 30/00* (2012.01)
*G06Q 30/06* (2012.01)
*G06Q 30/02* (2012.01)
*G06Q 10/06* (2012.01)

(52) U.S. Cl.
CPC .......... *G06Q 10/06* (2013.01); *G06Q 30/0603* (2013.01); *G06Q 30/0241* (2013.01); *G06Q 30/0601* (2013.01); *G06Q 10/06311* (2013.01)
USPC ...................................... 705/26.1

(58) Field of Classification Search
CPC .......................................... G06Q 30/06–30/08
USPC ................... 705/26, 27, 26.1–27.2
See application file for complete search history.

(56) References Cited

U.S. PATENT DOCUMENTS

| | | | |
|---|---|---|---|
| 5,301,320 A | 4/1994 | McAtee et al. | |
| 5,740,425 A | 4/1998 | Povilus | |
| 5,799,297 A | 8/1998 | Goodridge et al. | |
| 5,819,086 A | 10/1998 | Kroenke | |
| 5,999,911 A | 12/1999 | Berg et al. | |
| 6,073,109 A | 6/2000 | Flores et al. | |

(Continued)

OTHER PUBLICATIONS

Gebhardt, M., "Easily Create the Illusion of New and Multiple Templates" (Inside Microsoft Powerpoint 10.7, Jul. 2003, 4).*

(Continued)

*Primary Examiner* — Ethan D Civan
(74) *Attorney, Agent, or Firm* — Marc S. Kaufman; Reed Smith LLP

(57) ABSTRACT

A product catalog management system and method is provided for managing product data associated with a plurality of products. In one embodiment, the system comprises a processor, a product information database for storing product data associated with a plurality of products therein, a workflow design module for allowing creation of a workflow diagram for processing product data for storage in the product information database. The product catalog management system also includes a task management module that facilitates generation of a plurality of tasks for processing product data according to the workflow diagram, and a task assignment module adapted to assign the generated task for processing product data for completion.

33 Claims, 16 Drawing Sheets

(56) References Cited

U.S. PATENT DOCUMENTS

| | | |
|---|---|---|
| 6,430,538 B1 | 8/2002 | Bacon et al. |
| 6,442,563 B1 | 8/2002 | Bacon et al. |
| 6,557,013 B1 | 4/2003 | Ziff et al. |
| 6,697,784 B2 | 2/2004 | Bacon et al. |
| 6,732,331 B1 | 5/2004 | Alexander |
| 6,817,008 B2 | 11/2004 | Ledford et al. |
| 6,895,573 B2 | 5/2005 | Norgaard et al. |
| 6,944,619 B2 | 9/2005 | Gruenwald |
| 6,957,230 B2 | 10/2005 | Cameron et al. |
| 7,003,723 B1 | 2/2006 | Kremer et al. |
| 7,010,518 B1 | 3/2006 | Bedell et al. |
| 7,054,858 B2 | 5/2006 | Sutherland |
| 7,062,502 B1 | 6/2006 | Kesler |
| 7,099,887 B2 | 8/2006 | Hoth et al. |
| 7,100,147 B2 | 8/2006 | Miller et al. |
| 7,284,007 B1 * | 10/2007 | Francicus de Heer et al. ............... 707/102 |
| 2002/0184211 A1 | 12/2002 | Gruenwald |
| 2003/0004771 A1 | 1/2003 | Yaung |
| 2003/0004964 A1 | 1/2003 | Cameron et al. |
| 2003/0101194 A1 | 5/2003 | Rys et al. |
| 2004/0015367 A1 * | 1/2004 | Nicastro et al. ................ 705/1 |
| 2004/0078297 A1 | 4/2004 | Veres et al. |
| 2004/0078373 A1 | 4/2004 | Ghoneimy et al. |
| 2004/0083135 A1 * | 4/2004 | Chau ................ 705/26 |
| 2004/0098294 A1 * | 5/2004 | Dean et al. ................ 705/8 |
| 2004/0215642 A1 | 10/2004 | Cameron et al. |
| 2004/0267550 A1 | 12/2004 | Hsu et al. |
| 2005/0033683 A1 * | 2/2005 | Sacco et al. ................ 705/37 |
| 2005/0125310 A1 * | 6/2005 | Hazi et al. ................ 705/27 |
| 2005/0149539 A1 | 7/2005 | Cameron et al. |
| 2005/0251409 A1 | 11/2005 | Johnson et al. |
| 2006/0020619 A1 | 1/2006 | Netz et al. |
| 2006/0080300 A1 | 4/2006 | Gruenwald |
| 2007/0033098 A1 * | 2/2007 | Peters et al. ................ 705/14 |
| 2007/0174144 A1 | 7/2007 | Borders et al. |

OTHER PUBLICATIONS

International Search Report for PCT/US06/45465 dated Aug. 19, 2008.

* cited by examiner

| N/A | + | EN ▶ ACER / NOTEBOOKS / ACER FERRARI |
|---|---|---|
| MARKETING DESCRIPTION AND KSP INFORMATION | | |
| INFO NODE | | ACER FERRARI 5000 (FERRARI 5005WLMI) |
| REGION DESIGNATION | | UNITED STATES |
| MANUFACTURER URIS | | ▶ |
| ▽ MARKETING DESCRIPTION | | |
| MARKETING DESCRIPTION | | |
| MARKETING TEXT | | THIS TEXT HAS BEEN ENTERED IN <LINKED INFOITEM> OF "MARKETING DESCRIPTION" TYPE. |
| ▽ KSP | | |
| KEY SELLING POINTS | | |
| KSP TEXT | | THIS TEXT HAS BEEN ENTERED IN <LINKED INFOITEM> OF "KEY SELLING POINTS" TYPE. |

*FIG. 14*

PRODUCT CATALOG MANAGEMENT SYSTEM AND METHOD

This application claims priority to U.S. patent application Ser. No. 11/604,388, filed Nov. 27, 2006, the contents of which are incorporated herein by reference.

BACKGROUND OF THE INVENTION

1. Field of the Invention

The present invention is directed to systems and methods for managing an electronic product catalog. In particular, the present invention is directed to such a system and method that utilizes product templates, facilitates creation of a workflow to process product data, and allows generation and remote assignment of tasks to process such product data.

2. Description of Related Art

Various on-line services and merchants provide on-line catalogs that allow users to obtain information regarding many different types of products and/or purchase these from various different product categories. For example, on-line merchants such as www.amazon.com™ provide various tabs for categories of products in their catalog including tabs for books, apparel, electronics, etc. Upon selection of one of these tabs representing a category, a listing of plurality of subcategories is generated for selection by the user. Upon selection of a subcategory, further subcategories or plurality of products are displayed so that the user can again, select the desired subcategory to display the products of the subcategory, or select the desired product to obtain information and/or purchase the desired product.

Websites such as ww.cnet.com™ that provide users with product information and reviews as well as www.yahoo.com™ which is a search site, provide links to catalogs that allow users to shop for products from a various on-line merchants that sell the desired product. Upon selection of an appropriate shopping link, these websites typically display an electronic catalog with a plurality of product categories to allow the user to select a desired category of products. The user interface of the catalog then functions in a similar manner to the interface provided by on-line merchants such as those described above. In addition, some websites such as www.cnet.com™ further provide editorial reviews of the products as well.

Many different models of products from many different manufacturers are generally available for each type or category of product in the above noted websites. Typically, manufacturers of a particular category of product offer various models in their product line, each model targeting a particular group of users and/or meeting the specific needs of a market segment. In many instances, each model from each manufacturer and models from differing manufacturers have different features and/or attributes associated with the particular category of product.

Of course, the above described websites incorporate electronic catalogs implemented with a product database which stores product data and information associated to the plurality of products. However, the vast number of manufacturers and models available for each product category, and the disparity in features and/or attributes between the products of a product category pose various problems in implementing an electronic product catalog. In particular, the vast number of products and models makes proper categorization and storage of product data in the product database very difficult. Acquisition of the product data itself becomes extremely difficult, requiring many man-hours to acquire the product data for entry into the product database. More specifically, the acquisition of product data for a particular product is typically conducted by an individual who has broad breadth and depth of knowledge regarding the product and the product category. Because of the knowledge required for such acquisition of the product data, labor rates for such individuals are high, increasing the cost required to acquire the product data. Moreover, such databases are very complicated and cumbersome to use, with very little flexibility in terms of allowing for acquisition and management of the product data in the product database.

An example product database is described in U.S. Pat. No. 5,740,425 to Povilus which discloses a data structure and method for creating, maintaining, and publishing electronic catalogs using a product database that is based on SKUs. The disclosed data structure includes means for creating a product database and means for creating a KnowledgeBase, which includes a concept structure for at least one product realm and a glossary. The concept structure includes at least one concept frame for defining classes of product groupings, where the concept frames include a plurality of concept nodes having relationships based upon characteristics of the products within the product realm. The disclosed product database includes a listing of SKUs, each of which corresponds to a product or a component of a product. The product database further including product information for each associated SKU, and an identification of each concept node in which each SKU can be located. The glossary is used for searching for a particular product or group of products having desired characteristics. However, as evident from examination of Povilus, such systems are complicated, inflexible, and cumbersome to implement and use.

Therefore, there exists an unfulfilled need for a product catalog management system and method that facilitates acquisition and management of the product data in the product database. There also exists an unfulfilled need for such a product catalog management system and method that reduces the labor costs associated with acquisition of the product data as compared to prior art systems and methods.

SUMMARY OF THE INVENTION

In view of the foregoing, an advantage of the present invention is in providing a product catalog management system and method that facilitates acquisition and management of the product data in the product database.

Another advantage of the present invention is in providing a product catalog management system and method that reduces the labor costs associated with acquisition of the product data.

Still another advantage of the present invention is in providing a product catalog management system and method that provides features for facilitating various functions such as entry of product data, verification of product data comparison of products, writing a review for a product, associating products together, and translating product data into an another language.

In accordance with one aspect of the present invention, a product catalog management system is provided for managing product data associated with a plurality of products. In one embodiment, the system comprises a processor, a product information database in electronic communication with the processor for storing product data associated with a plurality of products therein, a workflow design module in electronic communication with the processor for allowing creation of a workflow diagram for processing product data for storage in the product information database. The product catalog management system also includes a task management module in electronic communication with the workflow design module that facilitates generation of a plurality of tasks for processing product data according to the workflow diagram, and a task assignment module in electronic communication with the task management module, the task assignment module adapted to assign the generated task for processing product data for completion.

In accordance with another embodiment, the product information database includes a plurality of product templates, each product template corresponding to a product category and having a plurality of product attribute fields. The product data stored in the product information database includes a plurality of instantiated product templates, each instantiated product template being associated to a particular product, and having attribute fields that are populated with attributes of the particular product. The attributes includes a standard description with at least make and model of the particular product, and at least one of an image of the particular product, text describing the particular product, and technical specifications of the particular product. Processing of product data assigned in the task may be any appropriate process, but is preferably entry of product data into the product information database, verification of product data, comparison of products, writing a review of a product, associating products together, and translating product data into an another language.

In accordance with another embodiment of the present invention, the product catalog management system further includes an interface module adapted to allow an analyst to interface with the system to complete the assigned task, and an editor module adapted to allow creation and editing of the plurality of product templates. In still another embodiment, the workflow design module includes a graphical user interface with a plurality of user selectable graphical objects for creating the workflow diagram.

In accordance with another embodiment of the present invention, the task assignment module assigns the generated task to an analyst, and the system further includes a terminal in electronic communication with the task assignment module that is accessed by the analyst to process the product data to complete the assigned task. The terminal is accessed by the identified analyst to at least one of enter product data, to verify product data, to compare products, to write a review of a product, associate products together, or translate product data into another language. The terminal is remotely located from the task assignment module, and is in electronic communication with the task assignment module via a wide area network.

In this regard, the product catalog management system further includes an analyst database having qualification information regarding a plurality of analysts. The task assignment module is adapted to assign a generated task to an analyst at least partially based on qualification information. In addition, the task assignment module further restricts access of the assigned analyst to product data in the product information database required to complete the assigned task. In accordance with another embodiment of the present invention, the task management module assigns a task type name to the generated tasks that identifies type of product data processing required to complete the generated task.

The product catalog management system further includes an interface module with a plurality of plug-ins associated with task type names, the interface module providing a user interface customized by a plug-in based on the assigned task to facilitate processing of the product data. In accordance with still another embodiment, the product catalog management system further includes a tools module including at least one of a normalization tool that normalizes or suggests normal values of an attribute for a product template, and a value determination tool that calculates values of product data for a product template.

In yet another embodiment of the present invention, a product catalog management system for managing product data associated with a plurality of products is provided, the system including a processor, and a product information database in electronic communication with the processor for storing product data associated with a plurality of products therein, the product information database including a plurality of product templates, each product template corresponding to a product category and having a plurality of product attribute fields, and a plurality of instantiated product templates, each of the instantiated product templates being associated to a particular product, with the product attribute fields being populated with attributes of the particular product. Preferably, processing of product data assigned in the task is entry of product data into the product information database, verification of product data, comparison of products, writing a review of a product, associating products together, and translating product data into an another language.

In accordance with another aspect of the present invention, a method of managing product data associated with a plurality of products is provided, the method including providing a product information database for storing product data associated with a plurality of products therein, creating a workflow diagram for processing product data for storage in the product information database, generating a plurality of tasks for processing product data according to the workflow diagram, and assigning a generated task for processing product data for completion.

In accordance with one embodiment, the processing of product data assigned in the task is entry of product data into the product information database, verification of product data, comparison of products, writing a review of a product, associating products together, or translating product data into another language. The method may also include providing an interface module to allow an analyst to complete the assigned task.

In accordance with yet another embodiment, the method may also include providing an analyst database having qualification information regarding a plurality of analysts, and assigning a generated task to an analyst at least partially based on qualification information. In addition, the method may further include restricting access of the assigned analyst to product data in the product information database required to complete the assigned task. In this regard, the method may include assigning a task type name to the generated tasks that identifies type of product data processing required to complete the generated task, and providing a user interface to the analyst that is customized with a plug-in corresponding to the task type name of the assigned task to facilitate processing of the product data by the analyst. Moreover, the method may further include normalizing or suggesting normal values of an attribute for a product template, or calculating values of product data for a product template.

Still another aspect of the present is in providing a computer readable media having computer executable instructions for managing product data associated with a plurality of products in the manner described above.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 14 illustrates a portion of an interface screen in accordance with another example implementation which incorporates a plug-in.

FIG. 15 illustrates a portion of an interface screen in accordance with yet another example implementation which incorporates a different plug-in.

DETAILED DESCRIPTION OF THE PREFERRED EMBODIMENT

Figure 1:
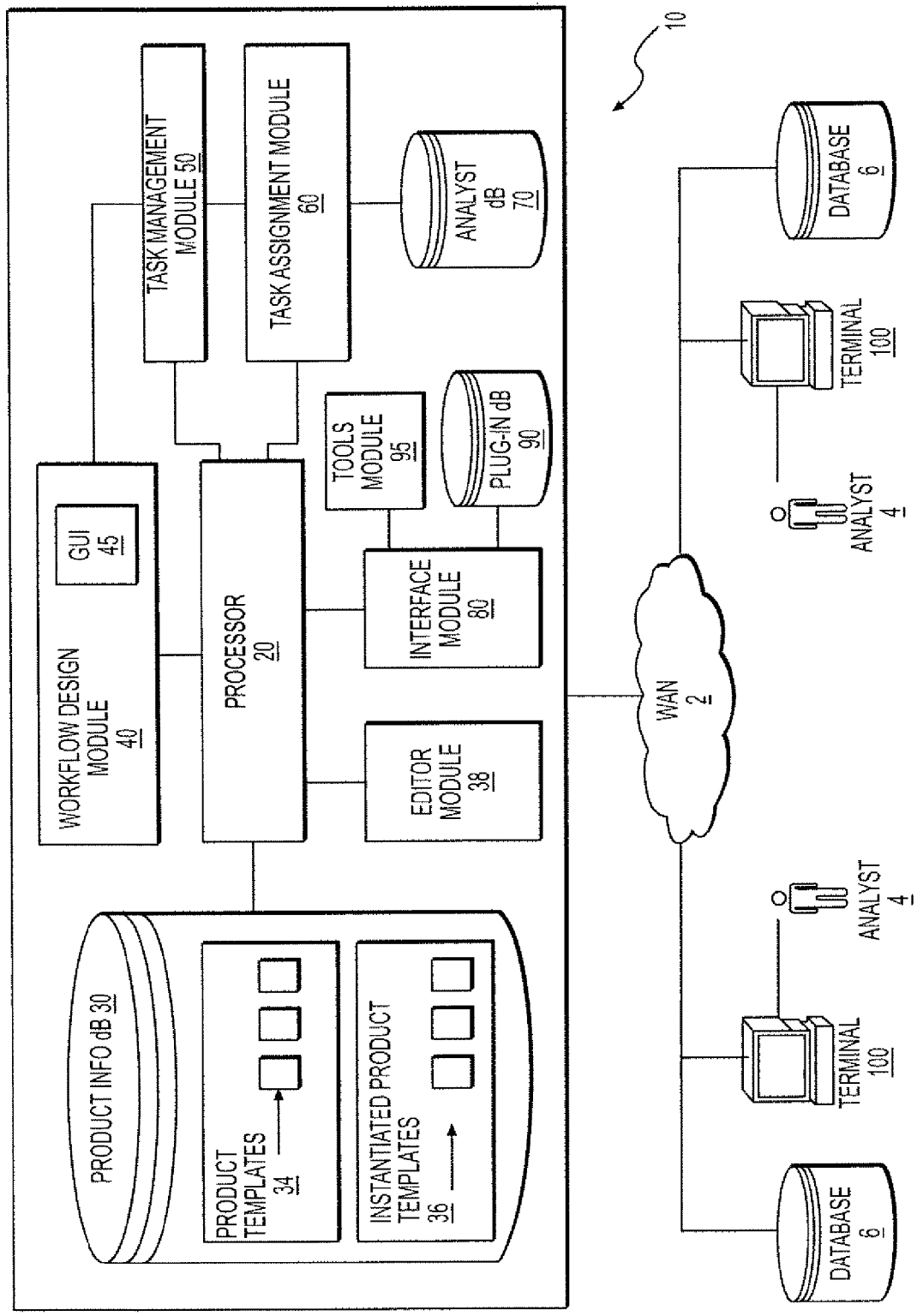
FIG. 1 is a schematic illustration of a product catalog management system in accordance with one example embodiment of the present invention.

FIG. 1 is a schematic illustration of a product catalog management system 10 in accordance with one embodiment of the present invention for managing product data associated with a plurality of products. It will be evident from the discussion below that the preferred embodiment of the present invention provides a product catalog management system which avoids the disadvantages of prior art systems, and facilitates acquisition and management of the product data in a more cost efficient manner as compared to prior art systems. In addition, it will also be evident that the product catalog management system 10 of the present invention provides features that facilitate various data processing functions such as entry of product data, verification of product data, comparison of products, writing a review for a product, associating products together, or translating product data into an another language. Of course, the product catalog management system 10 may be implemented and used for other functions as well, and the above noted data processing functions are merely provided as examples.

As explained herein below, the product catalog management system 10 and method of the present invention advantageously uses product templates with attributes, and instantiated product templates, to provide significant flexibility in the management of an electronic product catalog. In addition, the use of templates and attributes greatly facilitates separating the various operations required for management of the catalog and processing of product data into small, discrete tasks, which can then be assigned for completion, for example, to remotely located analysts. Use of customized user interfaces further facilitate completion of the required tasks. Thus, by utilizing such product templates in conjunction with a system for managing and assigning tasks, and by providing customized user interfaces, a tremendous synergy and unexpected improvements in efficiency and cost savings are realized by the product catalog management system and method of the present invention. The product data of the product catalog management system can be retrieved, and provided to the requester or customers, such as various websites or on-line vendors that utilize the provided information to generate electronic product catalogs for commerce.

In accordance with the illustrated embodiment of the present invention, product catalog management system 10 is provided with a processor 20 which is adapted to control and/or facilitate functions of various modules and components of the product catalog management system 10 as described in detail below. It should be initially noted that the product catalog management system 10 of FIG. 1 may be implemented with any type of hardware and software, and may be a pre-programmed general purpose computing device. For example, the product catalog management system 10 may be implemented using a server, a personal computer, a portable computer, a thin terminal, a hand held device, a wireless device, or any combination of such devices. The product catalog management system 10 may be a single device at a single location or multiple devices at a single, or multiple, locations that are connected together using any appropriate communication protocols over any communication medium such as electric cable, fiber optic cable, any other cable, or in a wireless manner using radio frequency, infrared, or other technologies.

It should also be noted that the product catalog management system 10 in accordance with one embodiment of the present invention is illustrated and discussed herein as having a plurality of modules and/or components which perform particular functions. It should be understood that these modules are merely schematically illustrated based on their function for clarity purposes only, and do not necessary represent specific hardware or software. In this regard, these modules and/or sub-modules may be hardware and/or software implemented to substantially perform the particular functions explained. Moreover, two or more of these modules may be combined together within the product catalog management system 10, or divided into more modules based on the particular function desired. Thus, the present invention as schematically embodied in FIG. 1 should not be construed to limit the product catalog management system 10 of the present invention.

In the illustrated embodiment, the product catalog management system 10 is connected to a network 2 that allows remote access to the product catalog management system 10 so that the product information and data can be processed and/or retrieved therefrom. Moreover, the illustrated embodiment of the network 2 allows the product catalog management system 10, or users thereof, such as analysts 4 to access various sources of information such as the manufacturer's or vendor's databases 6, to obtain various product data and information. Such databases may be publicly accessible databases that are maintained by manufactures and/or vendors of products.

The network 2 may be any type of communications channel, such as the Internet, a local area network (LAN), a wide area network (WAN) such as the Internet, direct computer connections, and may be accomplished in a wireless manner using radio frequency, infrared, or other technologies, using any type of communication hardware and protocols. The specific details of the above referenced devices and technologies are well known, and thus, omitted herein.

Referring again to the schematic illustration of FIG. 1, the product catalog management system 10 also includes a product information database 30 in electronic communication with the processor 20 for storing product data associated with a plurality of products therein. The product information database 30 may be implemented in any appropriate manner using programmable database tools or development tools, and may be implemented based on an enterprise database platform such as Microsoft SQL server, Oracle, Sybase, or My SQL, for example. In contrast to the prior art product databases in which the product data is categorized and stored based on SKU numbers, the product information database 30 includes a plurality of product templates 34. Each of the product templates 34 corresponds to, i.e. is associated with, a particular product category, for example, to a product category of desktop computer, cellular telephone, PDA, etc.

In addition, as discussed in further detail below, each of the product templates 34 have a plurality of product attribute fields in which attributes (i.e. product data and/or information) of the particular product can be entered and stored. In this regard, when the plurality of product attribute fields of a particular product template are populated with product data and information, the product template is "instantiated". Such product templates which are associated with a particular product are referred to herein as "instantiated product templates", and are distinguished from unpopulated templates referred to herein as "product templates".

The attributes of the product templates may include a standard description with at least make and model of the particular product, and at least one of an image of the particular product, text describing the particular product, and technical specifications of the particular product. Of course, in other implementations, the product templates may include other attributes as well, or have other attributes instead, depending on the product category. For example, a product template for a PDA may have an attribute referred to as "Display", whereas an product template for vacuum cleaners would not have such an attribute. As product data and information is acquired, for example, by analysts, from manufacturer/vendor databases 6, the attribute fields of the product template 34 for the corresponding product is populated with the product data acquired so that an instantiated product template is provided for the particular product. Thus, in accordance with the illustrated embodiment of the product catalog management system 10, the product data and information is entered into the product information database 30 using the product templates 34, so that for each particular product, an instantiated product template 36 is stored in the product information database 30.

An editor module 38 is also provided in the illustrated embodiment of the product catalog management system 10. The editor module 38 allows the product data stored in the product information database 30 such as the instantiated product templates 36 to be retrieved, viewed and edited as explained in further detail below. In addition, the editor module further allows creation and editing of the plurality of product templates 34, for example, when a new product category is to be added to the product information database 30, and/or if a new attribute field is to be added to an existing product template 34.

The product catalog management system 10 of the illustrated implementation of FIG. 1 also includes a workflow design module 40 which is in electronic communication with the processor 20. The workflow design module allows creation of a workflow diagram for processing product data that is managed by and stored in the product catalog management system 10. In this regard, the workflow design module 40 includes a graphical user interface 45 with a plurality of user selectable graphical objects for creating the workflow diagram as also described in further detail below.

In addition, the product catalog management system 10 of the illustrated embodiment of FIG. 1 also includes a task management module 50 that is in electronic communication with the workflow design module 40. The task management module 50 facilitates generation of a plurality of discrete tasks required for processing product data according to the workflow diagram. As also explained in further detail below, the task management module 50 of the illustrated embodiment also assigns a task type name to the generated tasks, the task type name identifying the type of product data processing which is required to complete the generated task.

In the above regard, the processing of product data assigned in the task may be any appropriate process, but preferably includes entry of product data into the product information database 30 using the product templates 34 as described above, or verification of product data that is already stored in the product information database 30, i.e. verification of the accuracy of the instantiated product templates 36. The generated tasks may also include comparison of products, and/or writing a review of a product which can be incorporated into the instantiated product templates 36 for comparative or evaluative purposes. The generated tasks may further include associating products together so that related products can be retrieved from the product information database 30 together, and provided to the requestor. Moreover, the generated task may also include translating the product data into another language. This allows the product information database 30 store product data in multiple languages so that it can be used to product data to customers on other countries. Of course, the above noted tasks are merely provided as examples only, and the product catalog management system may be used to complete other tasks as well, for example, providing or verification of metadata.

The product catalog management system 10 further includes a task assignment module 60 which is in electronic communication with the task management module 50 and the processor 20 in the illustrated implementation. The task assignment module 60 is adapted to assign the task generated by the task management module 50 for processing product data in accordance with the created workflow. The task may be assigned to an automated software module or device for completion. Alternatively, the task may be assigned to an analyst 4, who is a person, who can complete the task assigned. The task assignment module 60 is also preferably implemented to monitor the status of the assigned task, and to provide such status information to the administrator of the product catalog management system 10, or even to other analysts who have been assigned tasks, the completion of which requires completion of other tasks.

The product catalog management system 10 of the illustrated implementation further includes an analyst database 80 having qualification information regarding a plurality of analysts 4 that can perform the particular generated task. Such qualification information that is stored in the analyst database 80 may include particular skill sets, experience, service charge rates, and current availability, for each of the plurality of analysts 4. In such an implementation, the task assignment module 60 is adapted to assign a generated task to an analyst 4 at least partially based on qualification information obtained form the analyst database 80. In addition, the task assignment module 60 is preferably implemented to restrict access of the selected analyst (who is assigned the generated task) to the product catalog management system 10, based on the qualification information, so that the analyst is only allowed to access product data in the product information database 30 that is required to complete the assigned task.

The product catalog management system 10 of the illustrated embodiment shown in FIG. 1 also includes an interface module 90 adapted to allow an analyst 4 to interface with the system 10 to thereby complete the assigned task. For instance, the interface module 90 allows the analysts 4 to receive the task that is assigned by the task assignment module 60, accept or decline the task, access the required information in the product information database 30, complete the assigned task, and update the product catalog management system 10 accordingly, etc. Of course, these noted actions by the analyst using the interface module 90 are provided as examples only, and the present invention is not limited thereto.

The product catalog management system 10 of the illustrated embodiment shown in FIG. 1 further includes terminals 100 that are accessed by the analysts 4 to process the product data to complete the task assigned by interfacing with the interface module 80. The terminals 100 may be remotely located from the interface module 80, but be in electronic communication with the interface module 80 via a wide area network 2. In an example application of the present invention, the terminal 100 is accessed by the identified analyst 4 to enter product data, to verify product data, to compare products, to write a review of a product, associate products together, or translate product data into another language, etc.

The remote locality of the terminals 100 and remote accessibility of the interface module 80 allows the tasks to be assigned to remotely located analysts 4, for example, who may reside in other countries. This is especially advantageous because this allows the implementation of the product catalog management system 10 in the most cost effective manner since labor costs may be less if analysts in other countries are used. In addition, such analysts in other countries may also be the most qualified for a particular task, such as for translating product data into another language. This allows the product catalog management system 10 to be modified and expanded so that it can be used to provide product data and information to different markets that speak languages other than English.

In the present embodiment, the interface module 80 is preferably implemented to include a plurality of plug-ins, or software programs and modules, that serve as building blocks for providing an appropriate user interface such as a customized interface screen. For example, plug-ins may be a program that provides a web browser tool, or a group of freeform text input windows, etc. In this regard, each of the plurality of plug-ins of the interface module 80 are associated with a particular task or tasks. The plug-ins may be associated to one or more tasks via the task type names described above which are assigned by the task management module 50. The interface module 80 identifies the assigned task (for example, via the task type name), and executes the appropriate plug-in that is associated with the assigned task. The executed plug-in customizes the user interface generated by the interface module 80 that is provided to the terminal 100, so as to facilitate processing of the product data and completion of the assigned task by the analyst 4.

Moreover, to further facilitate completion of the assigned tasks, the product catalog management system 10 of the illustrated embodiment is also provided with a tools module 95 that provide various tools for expediting the completion of the assigned task(s). For example, the tools module 95 may be implemented to include a normalization tool that normalizes, or suggests, normal values or units of an attribute for a product template. The normalization tool may be implemented using drop down menus or the like in which the values or units of the attribute can be selected by the analyst 4 during performance of the assigned task. The tools module 95 may also be provided with a value determination tool that calculates values of product data for a product template. Thus, such tools provided by the tools module facilitates the completion of the assigned task by the task assignment module 60.

Figure 2:
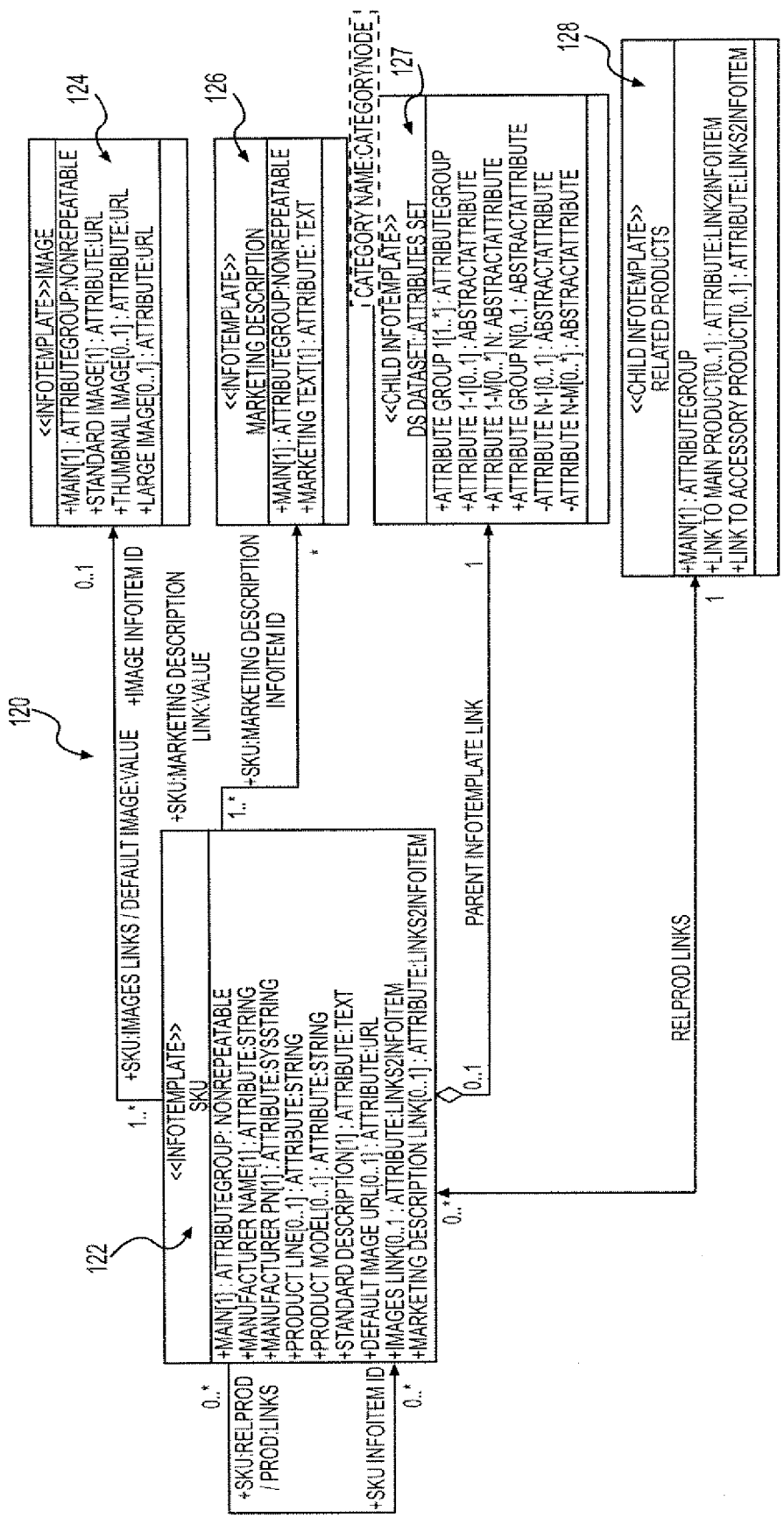
FIG. 2 is a schematic illustration of various product templates that are interlinked together and stored in the product information database.

Further detail regarding the various components of the product catalog management system 10 shown and briefly described above relative to FIG. 1 is described below with reference to various figures. In this regard, FIG. 2 shows a representative schematic illustration 120 of a product template 122 that may be stored in the product information database 30. The product template 122 shown in FIG. 2 is generically represented and has not been associated to a particular product category, or instantiated with attributes of a particular product. Correspondingly, as clearly shown, the product template 122 includes numerous unfilled attributes, for example, manufacturer name, manufacturer part number, product line, product model, standard description, default image URL, images link, and marketing description link. Of course, other attributes may be provided in the product template in other implementations. As previously described relative to FIG. 1, these attribute fields of the product template 122 are populated using attributes of a particular product, thus instantiating the product template to a particular product.

In addition, FIG. 2 also shows that a particular product template can be associated and linked with other templates so that, in effect, there are plurality of templates referred to within a product template, and an attribute of a product template can actually be populated via interlinking to another template (with attributes therein). Thus, in the schematic illustration shown in FIG. 2, the product template 122 is interlinked with template "Image" 124, template "Marketing Description" 126, template "Attribute Set" 127, and template "Related Products" 128. These interlinked product templates populate the attributes of the product template 122 itself For example, the attribute "Default Image" of product template 122 may be populated with the template "Image" 124, and attribute "Marketing Description Link" of the product template 122 may be populated with the template "Marketing Description" 126.

As clearly shown in FIG. 2, each of these templates which are interlinked to product template 122 include attributes of their own that can be appropriately populated with product data or information. However, these templates can be further interlinked to other product templates. Moreover, the templates may be utilized for other product templates as well, if appropriate, so that interlinking of product templates and instantiated product templates can be attained to provide many-to-many relationships between them.

For example, a product template for a desktop computer may include an attribute for processor type and speed (for example, Pentium™ 4, 3.0 Ghz). This attribute can be populated via a link to a different product template for processors which has been instantiated with information regarding the particular model of the processor, i.e. in the present example, instantiated with product attributes of the Pentium™ 4, 3.0 Ghz processor. Further, this instantiated product template for Pentium™ 4, 3.0 Ghz may also be referred to, or otherwise linked to, in an attribute for a product template regarding a particular model of a laptop computer which utilizes the same processor. Thus, the plurality of product templates 34, and instantiated product templates 36 stored in the product information database 30, may be interlinked to provide many-to-many relationships so as to minimize storage requirements while providing flexibility to utilize the instantiated product templates and the product information provided thereby, in any appropriate and desired manner for efficient implementation of the product catalog management system 10.

Figure 3:
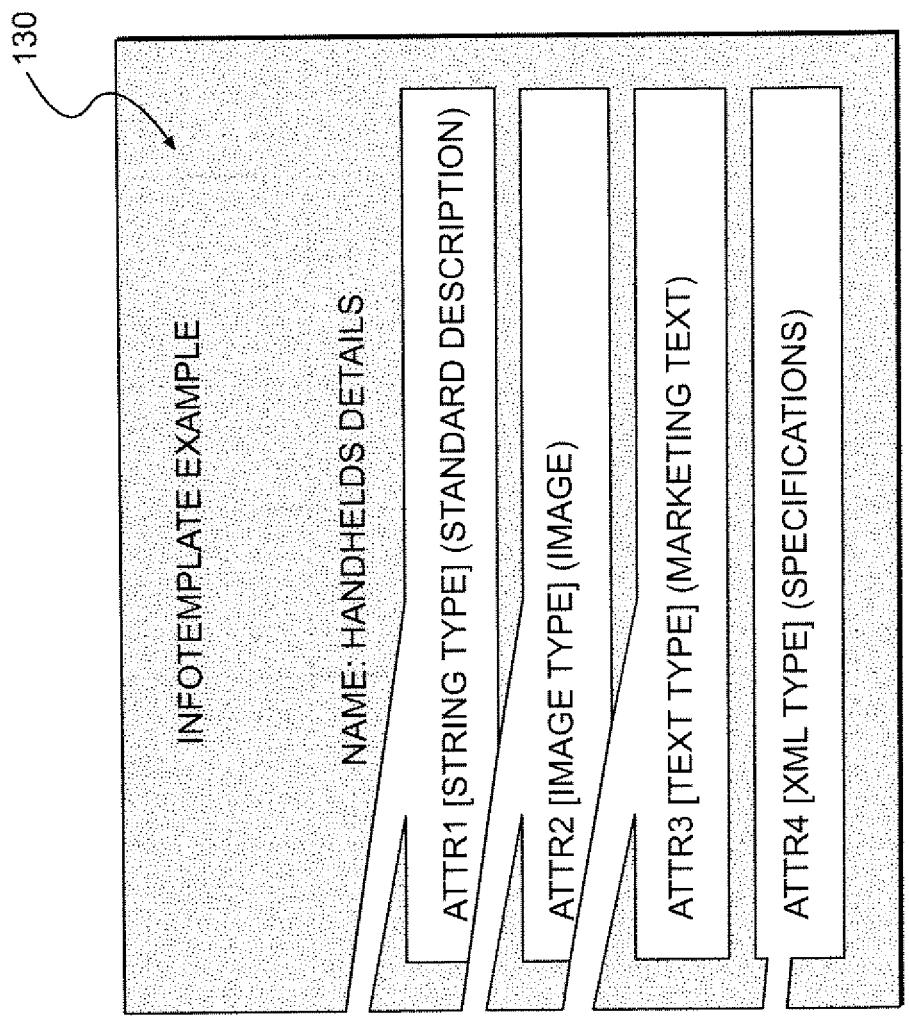
FIG. 3 is a schematic illustration of a product template and its attributes.

FIG. 3 shows a schematic illustration of a product template 130 named "HandHelds Details" that is adapted to be used for handheld PCs and PDAs. As can be seen, the product template 130 includes four attributes including attributes of "Standard Description", "Image", "Marketing Text", and "Specifications". Of course, other or different attributes may be provided instead. However, attributes are incorporated into a particular product template based on the likely usefulness or desirability of the attributes in providing valuable information regarding products for use in a product catalog. Correspondingly, the above noted attributes shown in FIG. 3 are very appropriate for providing desirable information regarding products in the category of handhelds. Moreover, such attributes can be utilized for other product templates for products of other product categories. Of course, the application of the present invention to the product category of PDAs is merely provided as one example, and the present invention is not limited thereto.

Figure 4:
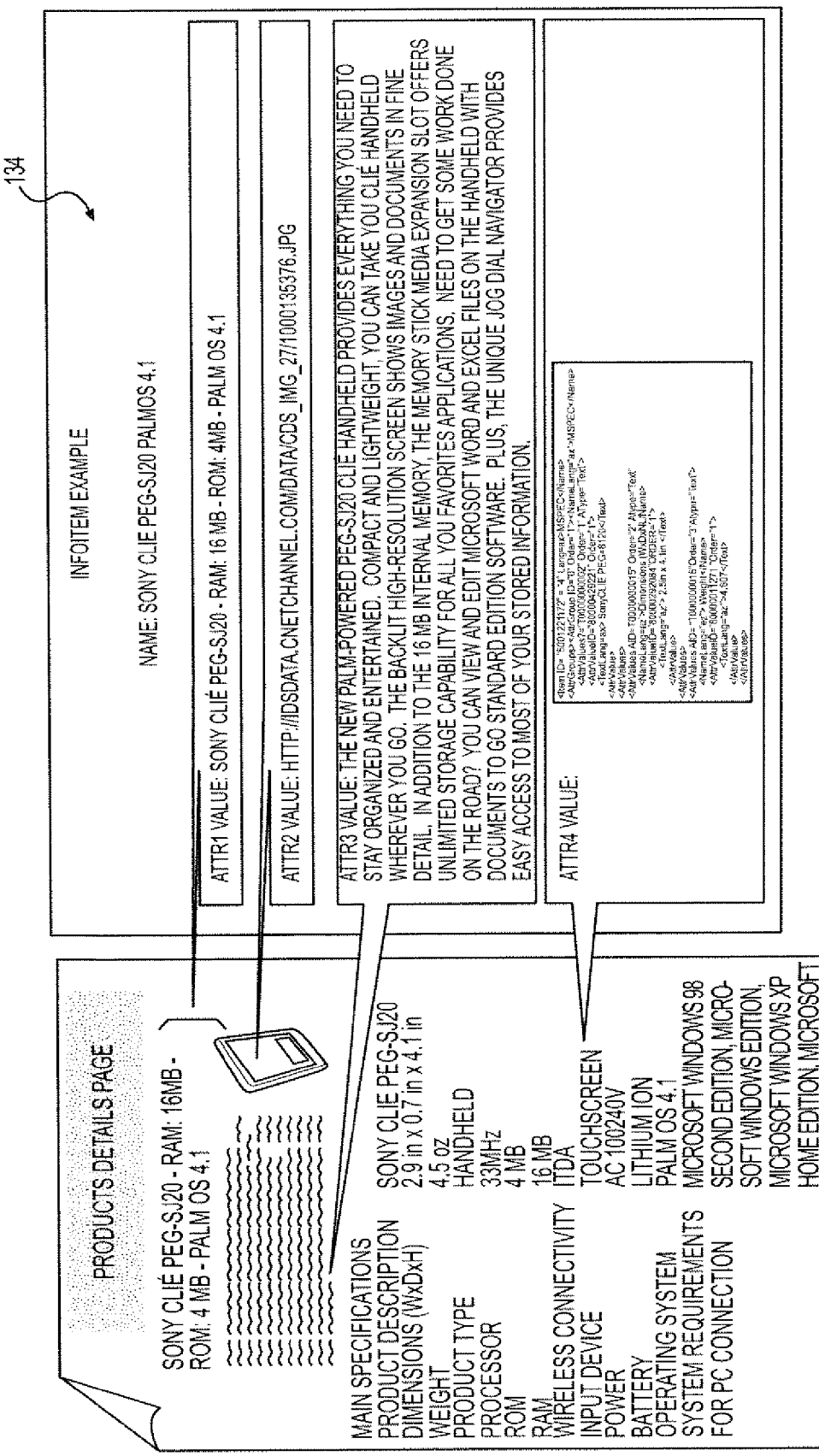
FIG. 4 is a schematic illustration of an instantiated product template and a product page of a product catalog rendered using the instantiated product template.

As noted, the attributes of the product template 130 are populated with attributes of a particular product, thereby instantiating the product template to a particular product. FIG. 4 shows a schematic illustration of an instantiated product template 134 for a handheld PC Sony Clie™ PEG-SJ20. As can be seen, the various attributes noted above in FIG. 3 for the product template 130 has been populated with product specific attributes for the Sony Clie™ model noted. The instantiated product template 134 can then be graphically rendered in a product information page of a product catalog or the like, which can be provided to customers and users of the product catalog management system. An example use of the instantiated product template 134 in a product catalog is shown by the "Product Details Page" 138 also shown in FIG. 4.

Thus, it should be evident from the above discussion and examples that the product templates 34 are named order set of attributes that define the structure of a product content, the product templates being highly reusable. In addition, as described, the product templates 34 can be interlinked together so that attributes are inherited, the attributes being named order set of values. In this regard, it should also be evident that the product templates 34 may be implemented with specific rules that define how the product templates 34 are to be used, for example, how product templates can be interlinked, the type of data that can populate a particular attribute field, and how attributes are inherited. Thus, the product catalog management system 10 allows the creation of many-to-many relationships between the data stored in the product information database 30 by the use of product templates and attributes.

As can be appreciated from the above, such an implementation permits reusability of these product templates, and allows for tremendous flexibility in association of the components of the product information database 30 to create a vast number of data packages that can be provided to the remote terminals for further processing by analysts and/or to the customers that receive the product data and information for use in electronic product catalogs. In addition, the product information database 30 as implemented allows easy addition and modification to the product data and information stored therein. If a particular product category needs to be added, a new product template can be readily created using the editor module 38 described above, and the created product template be used to acquire product information by populating the attributes of the product template in the manner previously described.

If product information associated with a particular product of an existing product category needs to be modified to add another newly developed attribute, the product template can be modified to include such an attribute, again using the editor module 38. The individual tasks for updating the instantiated templates can be created and assigned to analysts for the purpose of updating the instantiated product templates already stored in the product information database 30. For instance, many electronic devices are being improved by adding additional features previously not provided. For example, cell phones have relatively recently been improved to include photo taking features, and more recently, are being improved to include digital music storage and playback features. Thus, attributes such as camera resolution (pixels) and music storage capacity (bytes) can be added to the product templates for cellular phones, either directly, or by linkage to other templates.

Figure 5:
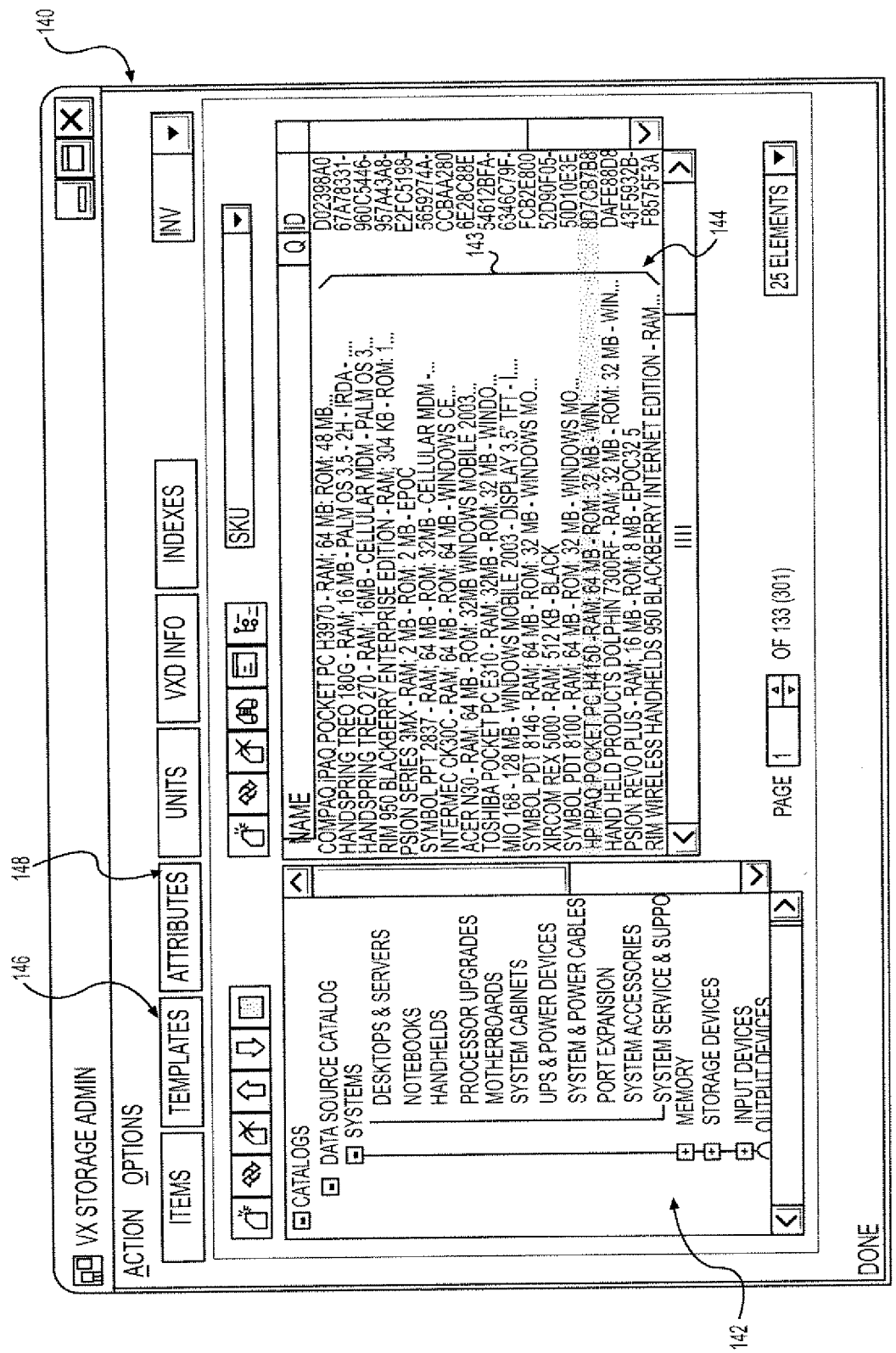
FIG. 5 illustrates an example user interface provided by the interface module.

FIG. 5 illustrates an example user interface 140 provided by the interface module 80 to an authorized individual, such as a systems administrator, for management of the product information database 30. The user interface 140 shown in FIG. 5 provides a product category field 142 that sets forth the various product categories in a node based taxonomy structure used for classification of products stored in the product information database 30. As can be seen in the illustration of FIG. 5, the "Systems" product category has been expanded, and the particular product "Handheld" has been selected. As a result, all of the instantiated product templates 143 corresponding to the selected product category of handhelds are displayed in listing field 144 of the user interface 140. It should be noted that in the illustrated embodiment, the product categories shown in the product category filed 142 (i.e., catalog nodes) are independent from the product templates described above relative to FIG. 2. Correspondingly, links between the product templates and the catalog nodes may be established to allow inheritance of attributes and/or templates from parent templates of parent categories. The user interface 140 allows an instantiated product template to be selected and retrieved. In addition, the user interface 140 allows product templates associated with product categories to be viewed by selection of the "Templates" tab 146 as described below, and the attributes of the product templates can also be viewed by selection of the "Attributes" tab 148.

Figure 6:
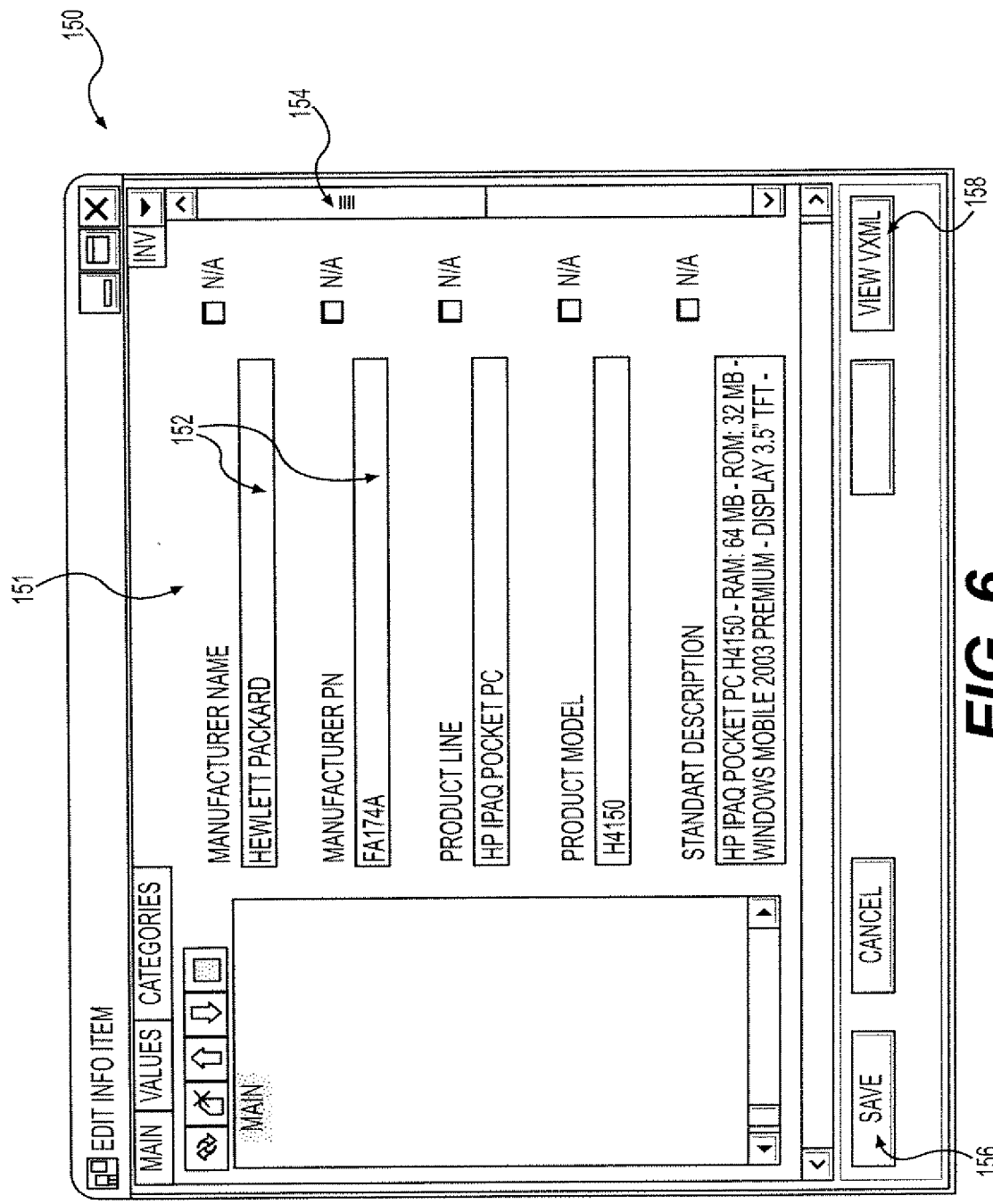
FIG. 6 illustrates an example of an instantiated product template for a handheld computer.

FIG. 6 illustrates the instantiated product template named "HP iPAQ Pocket PC" as being selected. Upon "double clicking" on the "HP iPAQ Pocket PC" selection or by selection of the Templates tab 146, the editor module 38 in conjunction with the interface module 80, generates an instantiated template window 150 shown in FIG. 6 which displays the instantiated product template 151 with a plurality of attribute fields 152 that have been populated with attributes of the selected handheld device. The window 150 generated by the editor module 38 allows the attributes fields 152 of the particular instantiated product template to be processed such as editing, updating, translating, etc. It should be noted that the window 150 shown in FIG. 6 does not show all of the attributes that have been used to instantiate the general product template for handheld devices. The remaining attributes can be displayed and/or edited by scrolling down the scroll bar 154. Any changes to the attributes 152 can be saved by selecting the "Save" button 156.

As also shown in FIG. 6, the display window 150 generated by the editor module 38 is implemented with a "View VXML" button 158. Upon selection of the VXML button 158, the editor module 38 displays the XML code associated with the particular instantiated product template retrieved. XML is an extensible mark-up language known in the art which can be utilized, and customized, for implementation of the product catalog management system 10 in accordance with the present invention. Of course, other mark-up languages may be used instead of XML in other implementations.

Figure 7:
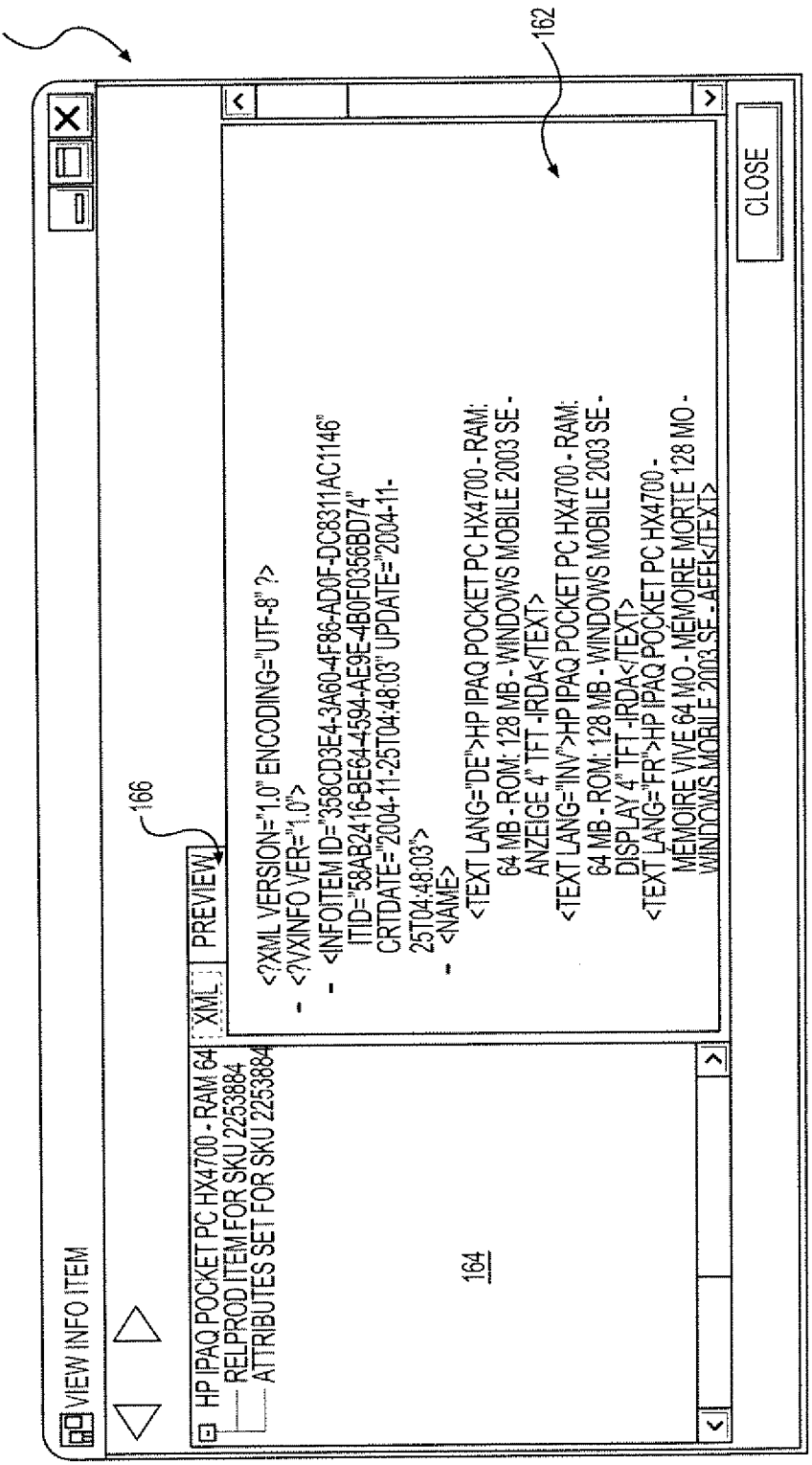
FIG. 7 illustrates an example XML window that is displayable using the editor module.
Figure 8:
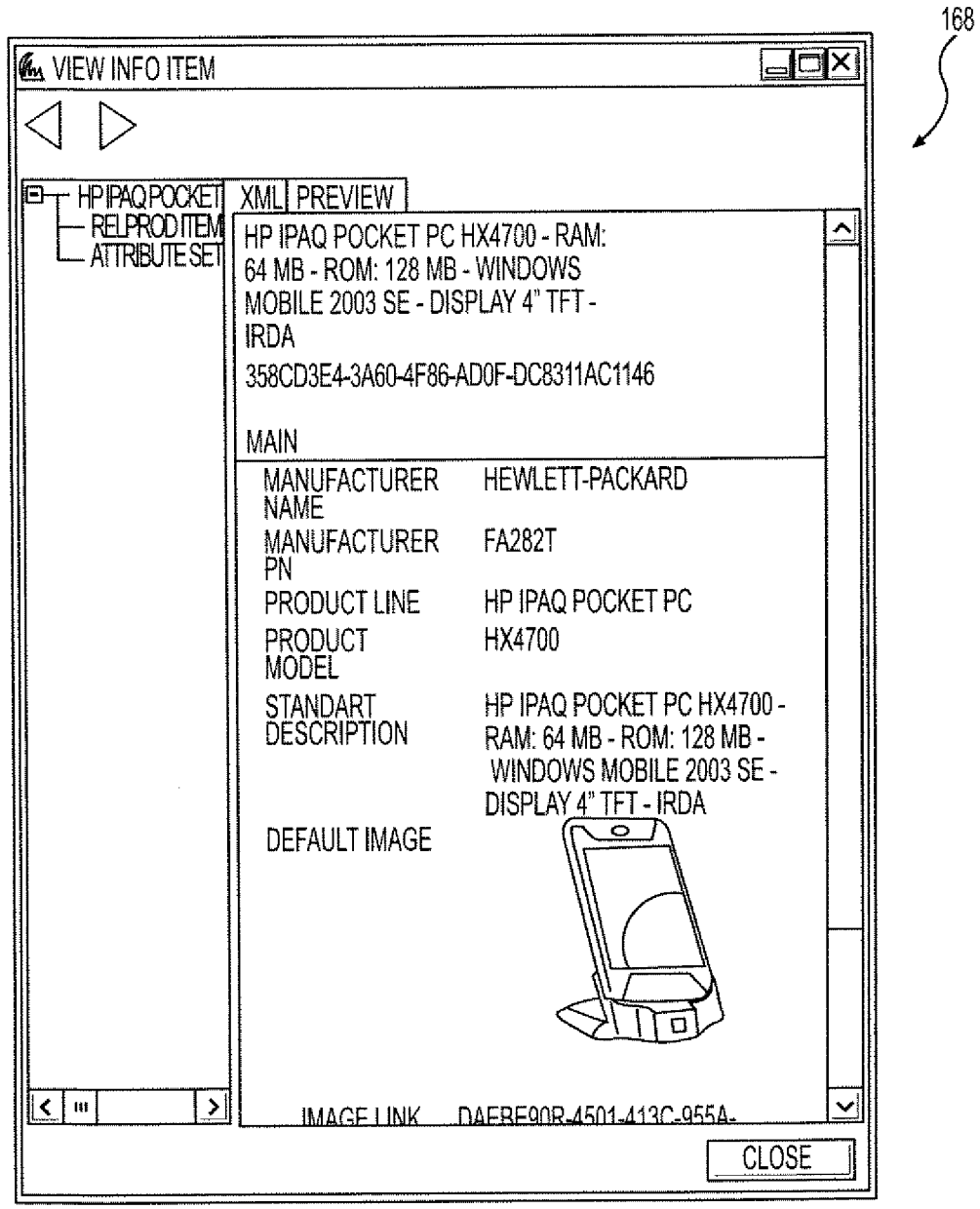
FIG. 8 illustrates a graphical rendering of the XML code in FIG. 7.

FIG. 7 shows an XML window 160 for another HP iPAQ Pocket PC device that is displayed by the editor module 38 via the interface module 80 upon selection of the VXML button 158 in the display window 150 described. The window 160 is provided with the display field 162 in which the XML code is displayed for the particular instantiated product template, in this case, for the particular model of the HP iPAQ. Moreover, menu field 164 of the window 160 provides a tree structure for the particular instantiated product template, including related product item information and attributes, either of which can be selected for viewing in window 160. Moreover, the window 160 is also provided with a "Preview" tab 166 that can be selected to view a graphical rendering of the XML code of the instantiated product template. Thus, upon selection of the Preview tab 166, the window 168 shown in FIG. 8 graphically renders the XML code based on the product template and attributes therein as shown.

Figure 9:
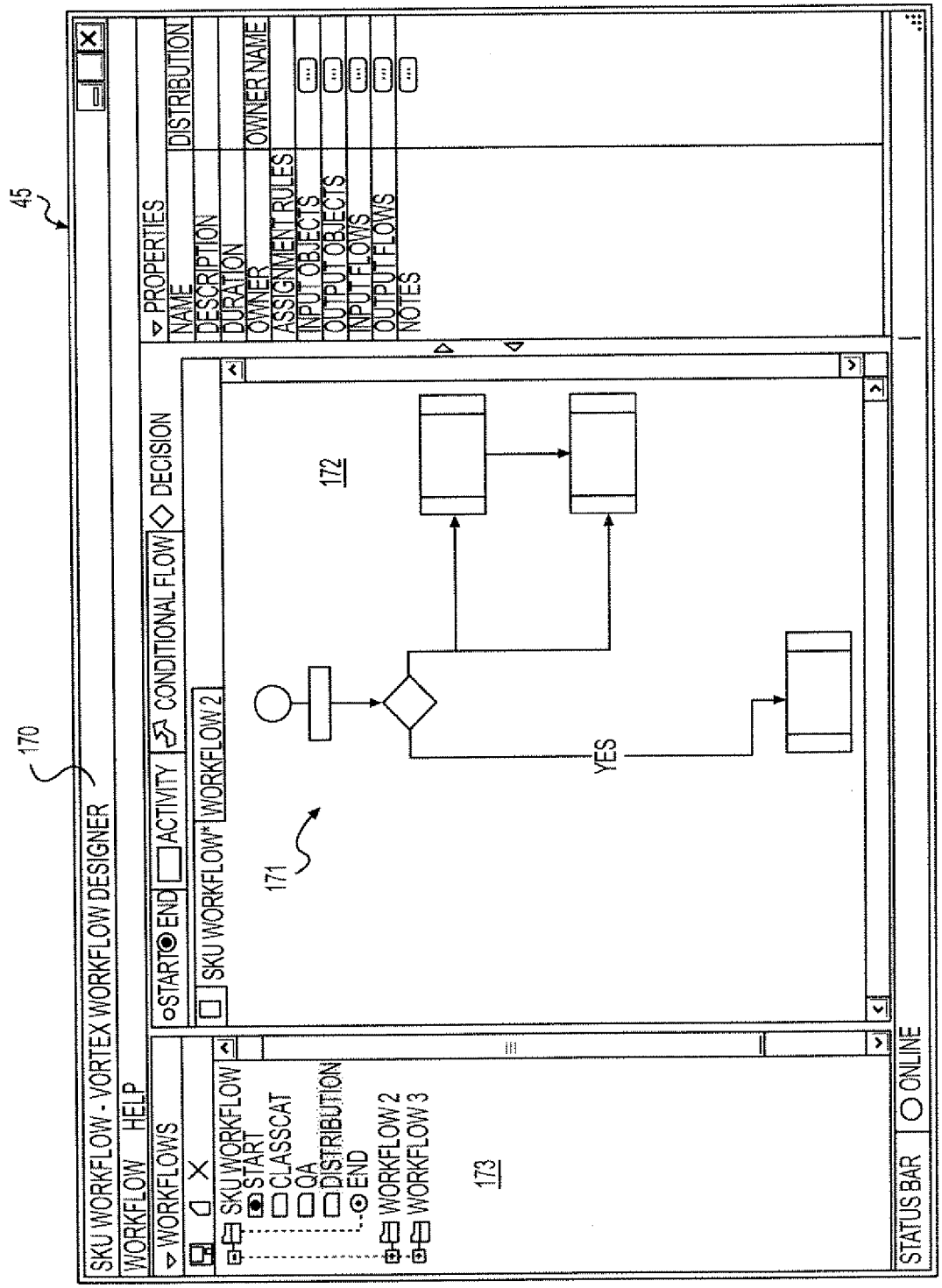
FIG. 9 illustrates an example implementation of the graphical user interface for the workflow design module.

FIG. 9 shows an example implementation of the graphical user interface 45 for the workflow design module 40 described above relative to FIG. 1. As noted, the workflow design module 40 is used to create a workflow diagram for processing product data for storage in the product information database 30 of the product catalog management system 10. The graphical user interface 45 of the workflow design module 40 is provided with a plurality of selectable graphical objects 170 that can be selected and dragged onto the workspace 172 to create a workflow, an example workflow diagram 171 being shown in FIG. 9. As shown, the graphical objects include Start, End, Activity, Conditional Flow and Decision. Of course, in other embodiments of the workflow design module 45, additional or alternative graphical objects may be provided.

The workflow design module 40 of the illustrated embodiment also includes a plurality of predefined workflows that can be retrieved and modified to create the desired workflow diagram. Such predefined workflows are schematically represented in the workflow window 173, which in the present illustration, sets forth a SKU workflow, workflow 2, and workflow 3. Provision of predefined workflow facilitates rapid preparation of workflow diagrams for commonly used workflows, without having to prepare such diagrams from the beginning.

Figure 10:
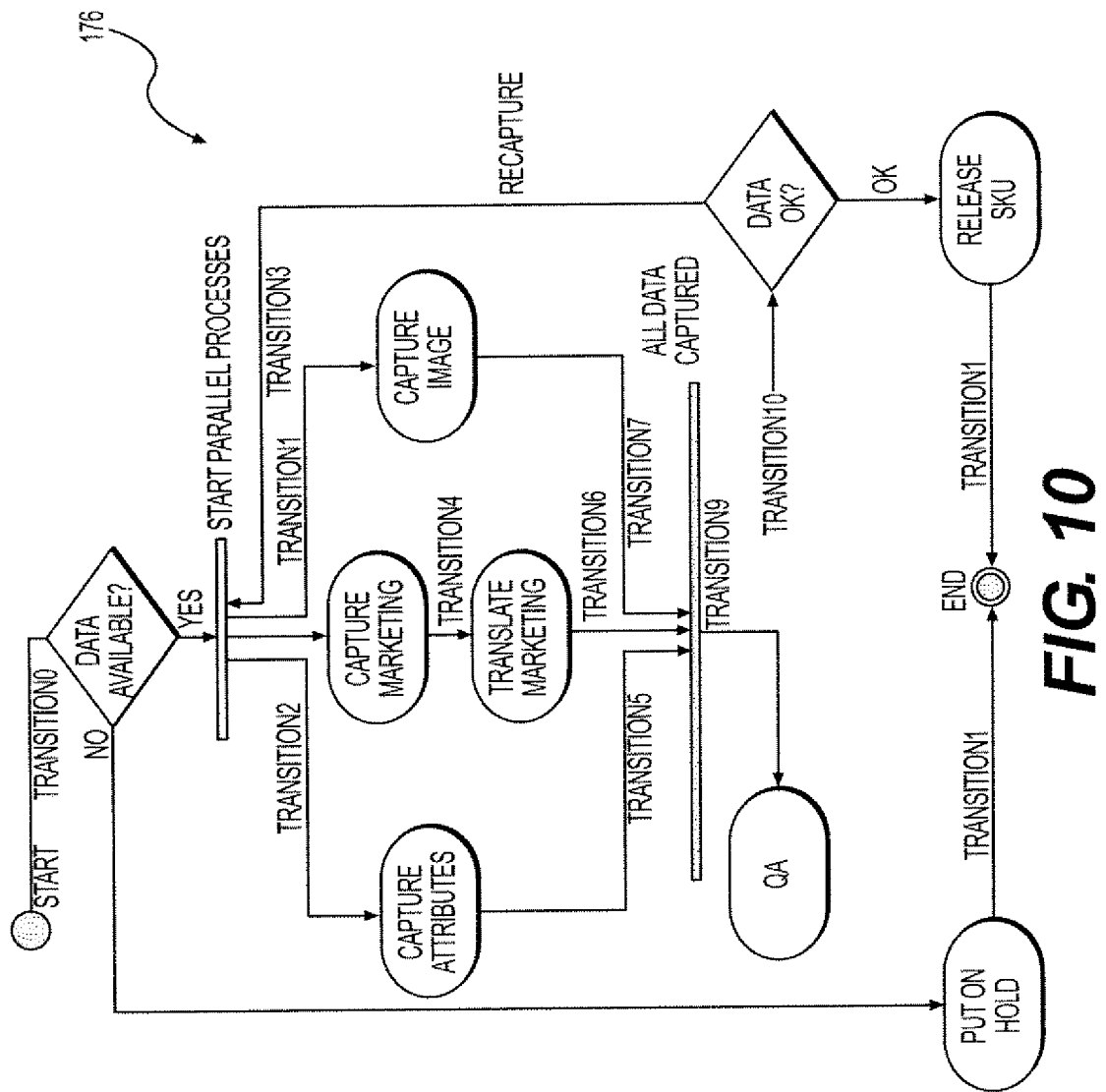
FIG. 10 illustrates an example workflow diagram which has been created using the graphical user interface.

FIG. 10 illustrates an example workflow diagram 176 which has been created using the graphical user interface 45 of the workflow design module 40 shown in FIG. 9. As can be seen, the example workflow diagram 176 provides a visual modeling of the process for processing product data, and includes a start and end points, and a plurality of activities shown in ovals which are required for completion of the created workflow. The transitions between the activities are illustrated with arrows, and the bold horizontal lines represent branching, or joining, of the arrows. The points of decision making are illustrated as rhombuses. The workflow design module 40 facilitates management of a sequence of work activities and the invocation of appropriate resources associated with the various activities as described in further detail below. In addition, the workflow design module 40 allows defining of the conditions or activities that trigger transitions between the various activities set forth in the workflow diagram.

It should be noted that the activities and decision making may be performed sequentially, in parallel, or even out of order, depending on the workflow desired. In addition, one activity in a particular workflow may itself constitute another workflow. For example, the activity of "Capture attributes" shown in the workflow diagram 176 of FIG. 10, may actually constitute another workflow diagram therein. In other words, another workflow diagram with associated activities may be listed within an activity of a given workflow diagram. Such nested workflow diagrams may also be provided in the workflow window 173 of the graphical user interface 45. Thus, once a workflow is created, it can be saved and reused alone, or in combination with other workflow diagrams, thereby allowing rapid and expedited creation of workflow diagrams.

As noted above, the task management module 50 analyzes the created workflow diagram to facilitate generation of a plurality of tasks for processing product data in accordance with the created workflow. Such tasks may include, but is not limited to, entry of product data into the product information database 30 using the product templates 34, verification of the product data already stored in the product information database 30, comparison of products, writing of a product review, associating products together (i.e. associating instantiated product templates together), and translating product data into another language. This is attained by analyzing the created workflow diagram to determining which activities and points of decision making need to be completed. Of course, as noted above, the activities may actually include nested workflow diagrams as well with their corresponding tasks.

Figure 11:
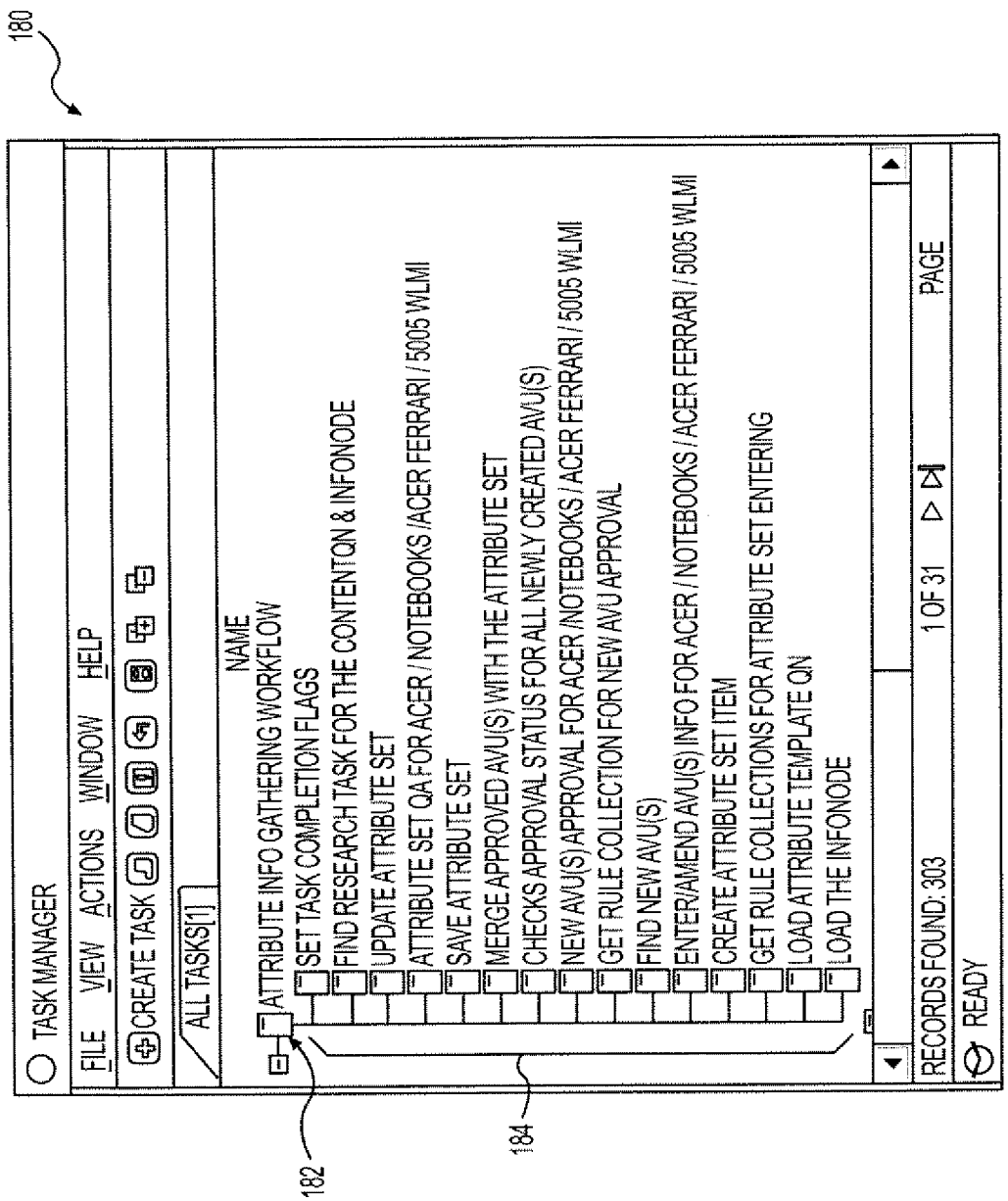
FIG. 11 illustrates an example task manager screen generated by the task management module.

FIG. 11 illustrates an example task manager screen 180 generated by the task management module 50. As can be seen, the workflow diagram entitled Attribute Info Gathering Workflow 182 has been analyzed to generate plurality of discrete tasks 184. As described above relative to FIG. 10, the tasks may also be derived from other workflows that are nested within the primary workflow analyzed. Each of these tasks may also be associated with an assigned task type name which identifies the type of product data processing required to complete the generated task. Such information may be utilized by the task assignment module 60 in the manner described below.

These tasks are then assigned to appropriate resources by the task assignment module 60. In particular, one or more tasks may be assigned to resources such as an automated software module or device that can electronically perform the required task. In addition, one or more tasks may be assigned to human resources, such as analysts 4 shown in FIG. 1, who can perform the task, either manually, or using various technological tools such as a software module or device. If the task is to be assigned to an analyst 4, the task assignment module 60 determines which analyst should be assigned a task based on the qualification information stored in the analyst database 70. As previously noted, such qualification information may include particular skill sets, experience, service charge rates, and current availability. Of course, other qualification information can be stored and used. Any appropriate logic which takes into consideration the qualification information in identification and selections an appropriate analyst 4 may be used.

The task assignment module 50 is also adapted to monitor the current status of the task assigned to each of the analysts 4. Thus, each task can be indicated as being "new", "allocations waiting" which means that there are some informational resources that need to be provided before the task can be completed, "executing", or "completed". As noted, such task status information can be provided to the administrator of the product catalog management system, and/or to appropriate analysts assigned with tasks that require completion of other tasks before they can be completed. Of course, other statuses for facilitating monitoring of the assigned tasks may be monitored in other implementations of the task assignment module 50, and the above are merely provided as examples.

As noted previously, the interface module 80 is preferably implemented to include a plurality of plug-ins, or software programs and modules, that serve as building blocks for providing an appropriate user interface such as a customized interface screen. Thus, when the task assigned by the task assignment module 60 is accepted and opened by the analyst 4 for execution, the interface module 80 executes an appropriate plug-in program which may be identified by the task type names associated with each of the tasks generated by the task management module 50. Correspondingly, the plug-ins function to custom tailor the user interface provided by the interface module 80 to the remotely located terminals 100 so that, depending on the task that is to be completed, the analyst is provided with the appropriate display screen and tools required for completion of the assigned task.

Thus, if the assigned task is to capture numerical product data, the interface screen provided by the interface module 80 is customized by the corresponding plug-in so that the interface screen resembles a conventional data entry screen with plurality of fields for entry of such numbers. If the assigned task is to interlink different products together, the interface screen provided by the interface module 80 is customized by the corresponding plug-in so that the interface screen includes two parallel catalog trees that can be used to identify corresponding products to be linked. In a like manner, the interface screen provided by the interface module 80 for completing data quality assurance may be customized by the corresponding plug-in so that the interface screen includes features of an editor such as the editor module 38. Of course, the above described implementations are merely provided as examples, and other plug-ins may be provided and used by the interface module 80.

Figure 12:
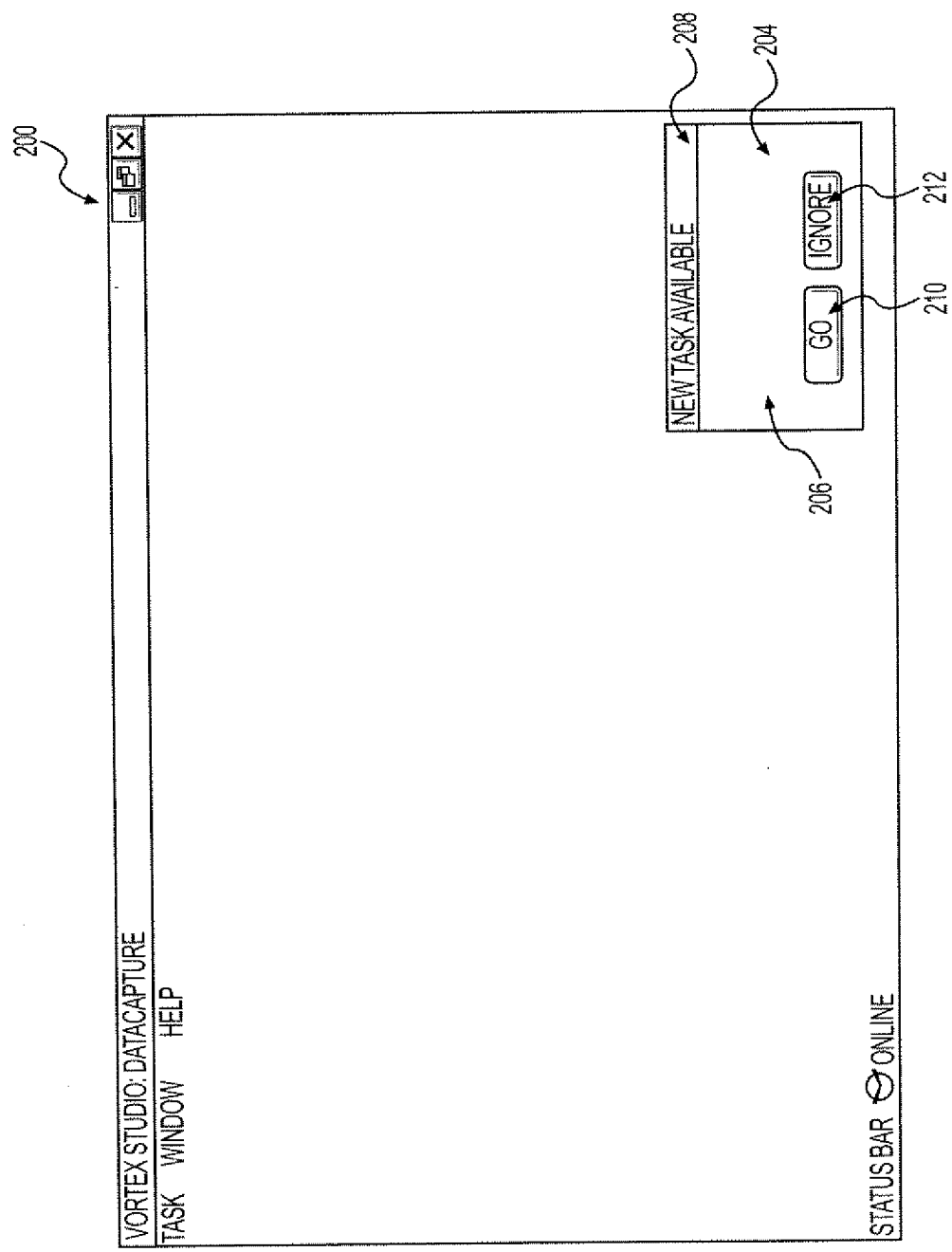
FIG. 12 illustrates a graphical user interface in accordance with one example implementation that is generated by the interface module.
Figure 13:
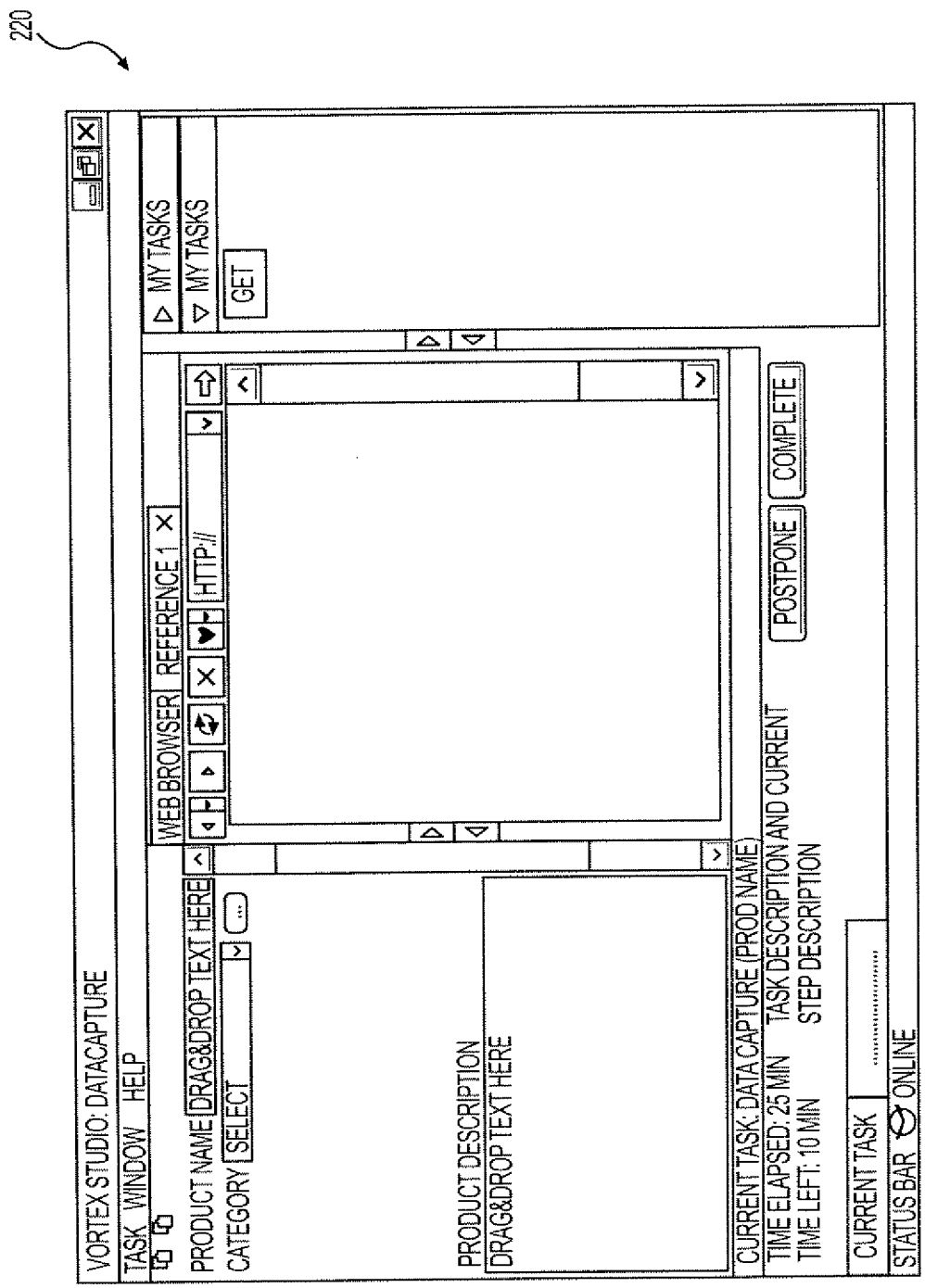
FIG. 13 illustrates an interface screen in accordance with one example implementation.

In the above described manner, the interface module 80 may be implemented to provide a graphical user interface to the respective terminals 100 so that analysts 4 can perform the tasks of processing product data that is assigned to them. In this regard, FIG. 12 illustrates a graphical user interface 200 in accordance with one example implementation that is generated by the interface module 80 for the respective terminals 100. When the task has been assigned to an analyst 4 by the task assignment module 60, a message is provided in a new task window 204. The new task window 204 provides an estimated time required for the analyst to complete the task in field 206, and also provides a small description of the task that has been assigned in field 208. The analyst can retrieve the assigned task by selection of the "Get" button 210, or temporarily ignore the assigned task by selection of "Ignore" button 212. In the illustrated embodiment, upon selection of the Get button 210, the graphical user interface 200 provides interface screen 220 shown in FIG. 13 which allows the analyst 4 to manage the task assigned and manage other tasks that may be pending. It is noted that FIG. 13 does not show a particular task, but just shows the interface screen in which a particular task can be displayed.

In addition, as described previously, upon selection of a particular assigned task, the interface screen 220 may be customized by execution of an appropriate plug-in to facilitate performance of the assigned tasks by the analyst 4. In this regard, FIG. 14 illustrates a portion of an interface screen 230 which has been customized by executing a plug-in for adding marketing description and key selling points regarding a particular product, i.e., a Acer Ferrari 5000 which is a notebook computer. As shown in FIG. 14, the interface screen 230 provides field 234 for entry of text associated with marketing for the Acer Ferrari 5000 product. In addition, the interface screen 230 provides field 236 for entering the text associated with the selling points of the Acer Ferrari notebook. Correspondingly, the interface module 80 provides to the terminal 100, a customized user interface by executing the appropriate plug-ins based on the task assigned, for example, by examination of the task type name, to thereby provide a user interface which facilitates the completion of the particular task assigned.

Figure 15:
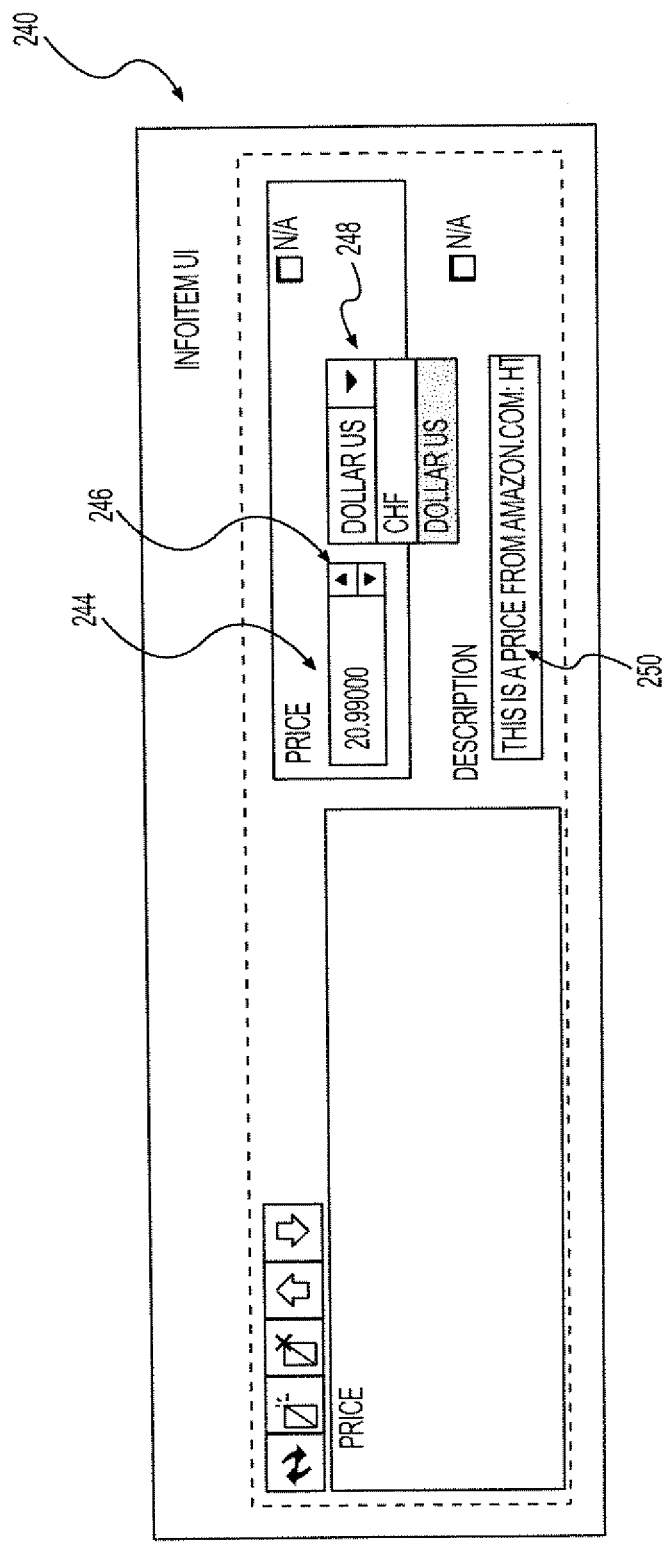

FIG. 15 shows another interface screen 240 provided by the interface module 80 in which another plug-in has been executed, the interface screen 240 being customized for the task of entering a price for a particular product. As can be seen, the interface screen 240 is provided with a price window 244 with selectable arrows 246 that allow upward or downward adjustment of the price. In addition, a drop down menu 248 is provided for selection of the unit corresponding to the price entered, for example, U.S. dollars, or other currencies. Moreover, a description window 250 may be provided to allow entry of some explanation as to the source of the price information obtained and entered.

Of course, it can be appreciated that the above described tasks, and the corresponding plug-ins and the features thereof, are provided as examples only and the present invention is not limited thereto. There are many tasks that can stem from management of the product catalog management system 10, and many plug-ins may be provided which correspond to the various tasks that can be used to greatly facilitate completion of the assigned task.

Figure 16:
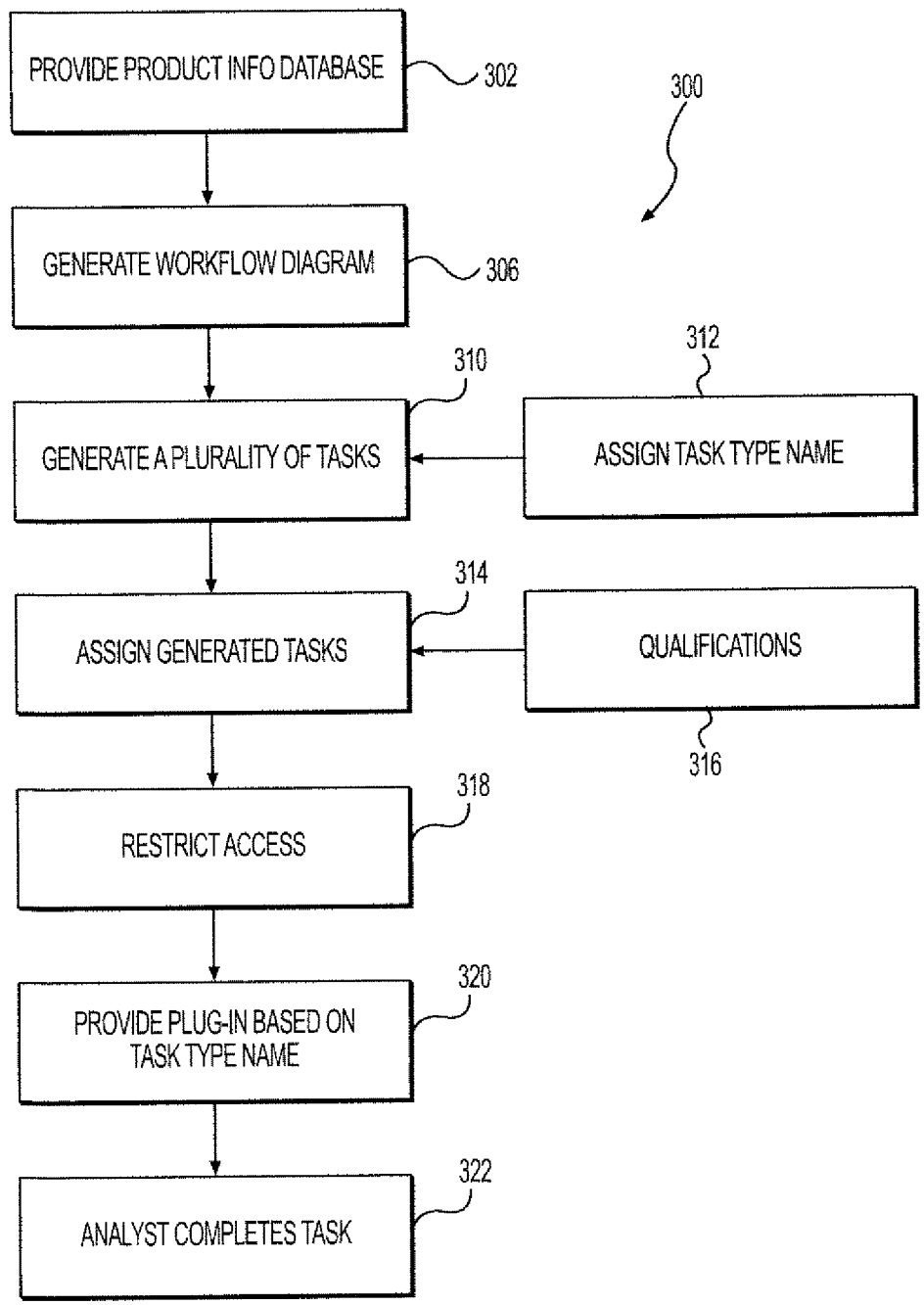
FIG. 16 is a flow diagram illustrating one example method in accordance with the present invention.

In accordance with another aspect of the present invention, a method is provided for managing product data associated with a plurality of products. In this regard, FIG. 16 is a flow diagram 300 that schematically illustrates the method in accordance with one example of the present invention. As shown, the method includes providing a product information database in step 302 for storing product data associated with a plurality of products. In step 306, a workflow diagram is created for processing product data stored in the product information database. In step 310, a plurality of tasks are generated for processing product data according to the workflow diagram. In this regard, task type name may be assigned in step 312.

The generated tasks for processing of product data are assigned in step 314 for completion. In this regard, the assignment may be based on considering the qualifications of the analysts as shown in step 316, such qualifications including skill set, charges, etc. The processing of product data assigned in the task may be entry of product data into the product information database, verification of product data, comparison of products, writing a review of a product, associating products together, translating product data into another language, or other tasks. Moreover, access to the product information database may be restricted to the assigned analyst in step 318 so that only access to the data required to complete the task is provided.

In step 320, a user interface is provided to the analyst which has been customized by execution of an appropriate plug-in to facilitate processing of the product data by the analyst, for example, by execution of the plug-in associated with the task type name of the assigned task. The analyst completes the task in step 322. Of course, the illustrated method of FIG. 16 is merely provided as an example, and the present invention is not limited thereto. In this regard, the method may include normalizing or suggesting normal values of an attribute for a product template, or calculating values of product data for a product template in other embodiments.

Still another aspect of the present is in providing a computer readable media having computer executable instructions for managing product data associated with a plurality of products in the manner described above. Such media may be based on any appropriate technologies, including, but not limited to, electronic, magnetic, optical, semiconductor, or other technologies, and may be embodied in a hard disk, compact disk, DVD, flash memory, and the like.

Thus, in view of the above, it should be evident how the present invention provides a product catalog management system which avoids the disadvantages of prior art systems, and facilitates acquisition and management of the product data in the product database. In addition, it should also be evident how the present invention provides a method of managing product data associated with products, and computer readable media having computer executable instructions for implementing such a system and/or method.

The present invention as described above can be advantageously used to maintain, modify and/or expand electronic product catalogs. The use of product templates with attributes, and instantiated product templates as described above, provide significant flexibility in the management of the electronic product catalog. In addition, the use of templates and attributes greatly facilitates and allows breaking up of the various operations required to maintain, modify and/or expand the catalog into small, discrete tasks. As such, these tasks can be readily identified using the workflow design module and the task management module as described above, and assigned by the task assignment module for completion, for example, to remotely located analysts. Thus, a tremendous synergy is realized by using templates and attributes, in conjunction with the workflow and task modules of the present invention.

For example, the product catalog management system and method of the present invention can be used to generate and assign small tasks to the analyst that can properly complete the task at the least expensive labor rate, thereby minimizing cost of acquiring product data. Moreover, because templates with attributes are used, product data and information can be quickly and cost effectively be updated, expanded, or otherwise modified. Thus, the present invention allows very efficient and cost effective allocation and reallocation of resources. Correspondingly, due to the synergy between templates/attributes and use of discrete tasks, unexpected improvements in efficiency and cost savings can be realized in the management of an electronic product catalog. The instantiated product templates of the product catalog management system, or the instantiated product templates of a particular product or product category, can also be retrieved from the product catalog management system, and provided to the requester or customers, such as various websites or on-line vendors that utilize the provided information to generate electronic product catalogs for commerce.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A product catalog management system for managing product data associated with a plurality of products, said system comprising:
   a processor;
   a product information database in electronic communication with said processor for storing product data associated with a plurality of products therein, said product information database including a plurality of product templates, each product template corresponding to a product category and having a plurality of product attribute fields, where a particular product template can be associated and linked with other templates to thereby effectively reference a plurality of templates within a product template, and a plurality of instantiated product templates, each of said instantiated product templates being associated to a particular product, with said product attribute fields being populated with attributes of the particular product;
   a task management module in electronic communication with said product information database that facilitates generation of a plurality of tasks; and
   a task assignment module in electronic communication with said task management module, said task assignment module adapted to assign a generated task for processing product data for completion.

2. The system of claim 1, wherein processing of product data assigned in said generated task is at least one of entry of product data into said product information database, verification of product data, comparison of products, writing a review of a product, associating products together, and translating product data into an another language.

3. The system of claim 1, said system further comprising:
   a workflow design module in electronic communication with said processor for creating a workflow diagram for processing product data for storage in said product information database, wherein the workflow diagram is used by the task management module to facilitate generation of said plurality of tasks.

4. The system of claim 3, wherein said workflow design module includes a graphical user interface with a plurality of user selectable graphical objects for creating said workflow diagram.

5. The system of claim 1, wherein said attributes includes a standard description with at least make and model of said particular product, and at least one of an image of said particular product, text describing said particular product, and technical specifications of said particular product.

6. The system of claim 1, further including an interface module adapted to allow an analyst to interface with said system to complete said assigned task.

7. The system of claim 1, further comprising an editor module adapted to allow creation and editing of said plurality of product templates.

8. The system of claim 1, wherein said task assignment module assigns said generated task to an analyst, and said system further includes a terminal in electronic communication with said task assignment module that is accessed by the analyst to process said product data to complete said assigned task.

9. The system of claim 8, wherein said terminal is accessed by said identified analyst to at least one of enter product data, to verify product data, to compare products, to write a review of a product, associate products together, and translate product data into another language.

10. The system of claim 8, further comprising an analyst database having qualification information regarding a plurality of analysts, wherein said task assignment module is further adapted to assign a generated task to an analyst at least partially based on qualification information.

11. The system of claim 10, wherein said task assignment module further restricts access of the assigned analyst to product data in said product information database required to complete said assigned task.

12. The system of claim 8, wherein said task management module assigns a task type name to said generated tasks that identifies a type of product data processing required to complete said generated task.

13. The system of claim 12, further including an interface module with a plurality of plug-ins associated with task type names, and wherein said interface module provides a user interface to said terminal customized by a plug-in based on said assigned task to facilitate processing of said product data.

14. The system of claim 8, wherein said terminal is remotely located from said task assignment module, and is in electronic communication with said task assignment module via a wide area network.

15. The system of claim 1, further including a tools module including at least one of a normalization tool that normalizes or suggests normal values of an attribute for a product template, and a value determination tool that calculates values of product data for a product template.

16. A computer-implemented method for managing product data stored in one or more databases associated with a plurality of products, said method comprising:
providing a product information database for storing product data associated with a plurality of products therein, said product information database including a plurality of product templates, each product template corresponding to a product category and having a plurality of product attribute fields, where a particular product template can be associated and linked with other templates to thereby effectively reference a plurality of templates within a product template, and a plurality of instantiated product templates, each of said instantiated product templates being associated to a particular product, with said product attribute fields being populated with attributes of the particular product;
generating by a computing device a plurality of tasks for processing said product data; and
assigning by a computing device said generated task for processing said product data for completion.

17. The method of claim 16, further comprising the step of creating a workflow diagram on a computing device for processing product data for storage in said product information database, wherein the workflow diagram is used in said generating step to facilitate generation of said plurality of tasks.

18. The method of claim 16, wherein said attributes include a standard description with at least make and model of said particular product, and at least one of an image of said particular product, text describing said particular product, and technical specifications of said particular product.

19. The method of claim 16, wherein processing of product data assigned in said task is at least one of entry of product data into said product information database, verification of product data, comparison of products, writing a review of a product, associating products together, and translating product data into another language.

20. The method of claim 16, further comprising providing an interface module to allow an analyst to interface with said computing device to complete said assigned task.

21. The method of claim 16, further comprising providing an analyst database having qualification information regarding a plurality of analysts, and assigning a generated task to an analyst at least partially based on qualification information.

22. The method of claim 21, further including restricting access of the assigned analyst to product data in said product information database required to complete said assigned task.

23. The method of claim 21, further including assigning a task type name to said generated tasks that identifies a type of product data processing required to complete said generated task, and providing user interface incorporating a plug-in program to the analyst to facilitate processing of said product data by the analyst.

24. The method of claim 23, further including normalizing or suggesting normal values of an attribute for a product template, or calculating values of product data for a product template.

25. At least one non-transitory computer-readable medium storing computer-readable instructions that, when executed by one or more computing devices, cause at least one of the one or more computing devices to:
provide a product information database for storing product data associated with a plurality of products therein, said product information database including a plurality of product templates, each product template corresponding to a product category and having a plurality of product attribute fields, where a particular product template can be associated and linked with other templates to thereby effectively reference a plurality of templates within a product template, and a plurality of instantiated product templates, each of said instantiated product templates being associated to a particular product, with said product attribute fields being populated with attributes of the particular product;
generate a plurality of tasks for processing product data; and
assign said generated task for processing product data for completion.

26. The at least one non-transitory computer-readable medium of claim 25, further storing computer-readable instructions that, when executed by at least one of the one or more computing devices, cause at least one of the one or more computing devices to allow creation of a workflow diagram for processing product data to store in said product information database.

27. The at least one non-transitory computer-readable medium of claim 25, wherein said attributes includes a standard description with at least make and model of said particular product, and at least one of an image of said particular product, text describing said particular product, and technical specifications of said particular product.

28. The at least one non-transitory computer-readable medium of claim 25, wherein processing product data for completion comprises at least one of entering of product data into said product information database verification of product data, comparison of products, writing write a review of a product, associating products together, and translating product data into another language.

29. The at least one non-transitory computer-readable medium of claim 25, further storing computer-readable instructions that, when executed by at least one of the one or more computing devices, cause at least one of the one or more computing devices to provide an interface module that allows an analyst to complete said assigned task.

30. The at least one non-transitory computer-readable medium of claim 25, further storing computer-readable instructions that, when executed by at least one of the one or more computing devices, cause at least one of the one or more computing devices to provide an analyst database for storing qualification information regarding a plurality of analysts, and computer executable instructions for assigning a generated task to an analyst at least partially based on qualification information.

31. The at least one non-transitory computer-readable medium of claim 30, further storing computer-readable instructions that, when executed by at least one of the one or more computing devices, cause at least one of the one or more computing devices to restrict access of the assigned analyst to product data in said product information database required to complete said assigned task.

32. The at least one non-transitory computer-readable medium of claim 30, further storing computer-readable instructions that, when executed by at least one of the one or more computing devices, cause at least one of the one or more computing devices to assign a task type name to said generated tasks that identifies a type of product data processing required to complete said generated task, and computer executable instructions for providing a plug-in to the analyst corresponding to the task type name of the assigned task to facilitate processing of said product data by the analyst.

33. The at least one non-transitory computer-readable medium of claim 32, further storing computer-readable instructions that, when executed by at least one of the one or more computing devices, cause at least one of the one or more computing devices to normalize or suggest normal values of an attribute for a product template, or calculate values of product data for a product template.

\* \* \* \* \*